US012283219B2

(12) United States Patent
Zhao et al.

(10) Patent No.: US 12,283,219 B2
(45) Date of Patent: Apr. 22, 2025

(54) DISPLAY PANEL, METHOD FOR DRIVING DISPLAY PANEL, AND DISPLAY APPARATUS

(71) Applicants: WUHAN TIANMA MICRO-ELECTRONICS CO., LTD., Wuhan (CN); Wuhan Tianma Microelectronics Co., Ltd. Shanghai Branch, Shanghai (CN)

(72) Inventors: Zhe Zhao, Wuhan (CN); Yana Gao, Wuhan (CN); Xingyao Zhou, Wuhan (CN); Mengmeng Zhang, Wuhan (CN); Zhi Liu, Wuhan (CN); Shuai Yang, Wuhan (CN); Chenguang Sun, Wuhan (CN)

(73) Assignees: Wuhan Tianma Micro-Electronics Co., Ltd, Wuhan (CN); Wuhan Tianma Microelectronics Co., Ltd. Shanghai Branch, Shanghai (CN)

( * ) Notice: Subject to any disclaimer, the term of this patent is extended or adjusted under 35 U.S.C. 154(b) by 0 days.

(21) Appl. No.: 18/355,585

(22) Filed: Jul. 20, 2023

(65) Prior Publication Data

US 2023/0368721 A1 Nov. 16, 2023

(30) Foreign Application Priority Data

Mar. 14, 2023 (CN) ........................ 202310244883.X

(51) Int. Cl.
*G09G 3/20* (2006.01)

(52) U.S. Cl.
CPC ... *G09G 3/2092* (2013.01); *G09G 2300/0452* (2013.01); *G09G 2310/0267* (2013.01); *G09G 2310/0275* (2013.01)

(58) Field of Classification Search
CPC ......... G09G 3/2092; G09G 2300/0452; G09G 2310/0267; G09G 2310/0275; G09G 3/20;
(Continued)

(56) References Cited

U.S. PATENT DOCUMENTS 6,320,572 B1 * 11/2001 Takabayashi ........ G09G 3/3611 345/204
6,486,860 B1 * 11/2002 Eschbach ................. G09G 3/32 345/82
(Continued)

*Primary Examiner* — Jose R Soto Lopez
(74) *Attorney, Agent, or Firm* — CHRISTENSEN O'CONNOR JOHNSON KINDNESS PLLC

(57) ABSTRACT

The display panel includes pixel groups including multiple sub-pixels; and driving signal lines. One driving signal line corresponds to at least one pixel group of the pixel groups, and multiple driving signal lines sequentially output a charging enabling level to drive corresponding pixel groups. The sub-pixel includes a first color sub-pixel that includes a first sub-pixel and a second sub-pixel. The first and second sub-pixels are arranged along an arrangement direction of the pixel group, and the second sub-pixel and the first sub-pixel are spaced by other first color sub-pixels whose number is not greater than a preset number. In a first mode, the display panel receives a noise signal, and a phase difference between charging enabling levels provided by the driving signal lines corresponding to the first sub-pixel and the second sub-pixel is non-integer times a noise cycle.

19 Claims, 25 Drawing Sheets

(58) Field of Classification Search
CPC ... G09G 2300/0426; G09G 2320/0209; G09G 2320/0233
See application file for complete search history.

(56) References Cited

U.S. PATENT DOCUMENTS

| | | | | |
|---|---|---|---|---|
| 7,924,250 | B2 * | 4/2011 | Roy | G09G 3/3258 345/82 |
| 10,056,052 | B2 * | 8/2018 | Shin | G09G 3/3688 |
| 11,538,383 | B2 * | 12/2022 | Tang | G09G 3/20 |
| 2005/0231409 | A1 * | 10/2005 | Yamaguchi | G09G 3/3696 341/144 |
| 2007/0211003 | A1 * | 9/2007 | Chen | G09G 3/3611 345/87 |
| 2007/0262924 | A1 * | 11/2007 | Kim | G09G 3/293 345/67 |
| 2007/0279369 | A1 * | 12/2007 | Yao | G09G 3/3406 345/102 |
| 2008/0024404 | A1 * | 1/2008 | Tanaka | G09G 3/3648 345/87 |
| 2009/0046113 | A1 * | 2/2009 | Murakami | G06V 10/30 430/7 |
| 2010/0264965 | A1 * | 10/2010 | Cloutier | H03L 7/1974 327/157 |
| 2011/0304594 | A1 * | 12/2011 | Huang | G09G 3/20 345/204 |
| 2012/0249618 | A1 * | 10/2012 | Sugiyama | H04L 25/4908 345/691 |
| 2014/0111406 | A1 * | 4/2014 | Wang | G09G 3/3233 345/77 |
| 2014/0160172 | A1 * | 6/2014 | Lee | G09G 3/3607 345/690 |
| 2015/0161927 | A1 * | 6/2015 | Hekstra | G09G 3/3614 345/209 |
| 2015/0348485 | A1 * | 12/2015 | Lee | G09G 3/3648 345/99 |
| 2017/0039927 | A1 * | 2/2017 | Masumura | G09G 3/2018 |
| 2017/0061872 | A1 * | 3/2017 | Zhou | G09G 3/3266 |
| 2017/0071040 | A1 * | 3/2017 | Kimura | H03K 5/131 |
| 2017/0104618 | A1 * | 4/2017 | Yoon | G09G 5/006 |
| 2018/0061350 | A1 * | 3/2018 | Sung | G09G 3/3696 |
| 2019/0228726 | A1 * | 7/2019 | Ono | G09G 3/3291 |
| 2019/0259324 | A1 * | 8/2019 | Liu | G09G 3/2003 |
| 2019/0362666 | A1 * | 11/2019 | Chen | G09G 3/20 |
| 2020/0111431 | A1 * | 4/2020 | Zheng | G09G 3/3614 |
| 2020/0166815 | A1 * | 5/2020 | Huang | G02F 1/136286 |
| 2020/0168158 | A1 * | 5/2020 | Zheng | G09G 3/3266 |
| 2020/0184895 | A1 * | 6/2020 | Zhao | G09G 3/2074 |
| 2021/0191554 | A1 * | 6/2021 | Jun | G09G 3/3674 |
| 2021/0201796 | A1 * | 7/2021 | Park | G09G 3/3233 |
| 2022/0206660 | A1 * | 6/2022 | Kang | G09G 3/2092 |
| 2022/0208121 | A1 * | 6/2022 | Lee | G09G 3/3291 |
| 2022/0309984 | A1 * | 9/2022 | Xi | G09G 3/2007 |
| 2022/0328600 | A1 * | 10/2022 | Dong | H10K 59/353 |
| 2022/0335884 | A1 * | 10/2022 | Lee | G09G 3/32 |
| 2023/0050569 | A1 * | 2/2023 | Dong | G09G 3/3233 |
| 2023/0054156 | A1 * | 2/2023 | Sin | G09G 3/006 |
| 2024/0013708 | A1 * | 1/2024 | Ozbas | G09G 3/32 |

* cited by examiner

DISPLAY PANEL, METHOD FOR DRIVING DISPLAY PANEL, AND DISPLAY APPARATUS

CROSS-REFERENCE TO RELATED APPLICATION

The present application claims priority to Chinese Patent Application No. 202310244883.X, filed on Mar. 14, 2023, the contents of which is incorporated herein by reference in its entirety.

TECHNICAL FIELD

The present disclosure relates to the technical field of display, and in particular, to a display panel, a method for driving a display panel, and a display apparatus.

BACKGROUND

With the intelligent development of display panels, multiple types of sensors can be integrated into a display panel. In some application scenarios, the display panel needs to receive electromagnetic and other signals to achieve specific functions.

To shield impacts of such signals on display, a shielding layer is usually attached to one side of the display panel. However, attaching the shielding layer not only increases a thickness of a screen body as well as material, device, time, and other process costs, but also limits freedom of a under-screen sensor design. For example, in a display panel with a perforated region, sensors are concentrated in the perforated region, and the shielding layer needs to be hollowed in the perforated region to avoid the sensors. However, setting the shielding layer in this way cannot protect the perforated region, resulting a display difference between the perforated region and a non-perforated region.

SUMMARY

A first aspect of the present disclosure provides a display panel. The display panel includes pixel groups and driving signal lines. At least one of the pixel groups includes sub-pixels. An arrangement direction of the pixel groups intersects an arrangement direction of the sub-pixels in the pixel group. One driving signal line corresponds to the sub-pixels in at least one of pixel groups. The driving signal lines sequentially output charging enabling levels in a first order to drive the corresponding pixel groups. The sub-pixels include a first color sub-pixel, the first color sub-pixels include a first sub-pixel and a second sub-pixel. The first sub-pixel and the second sub-pixel are located in different pixel groups and correspond to different driving signal lines. The first sub-pixel and the second sub-pixel are arranged along the arrangement direction of the pixel groups. The second sub-pixel and the first sub-pixel are spaced by other first color sub-pixels. The number of the other first color sub-pixels is not greater than a preset number. The display panel has a first mode. In the first mode, the display panel receives a noise signal having a noise cycle, and a phase difference between charging enabling levels provided by the driving signal lines corresponding to the first sub-pixel and the second sub-pixel is non-integer times of the noise cycle.

A second aspect of the present disclosure provides a method for driving a display panel described in the first aspect. The method includes: receiving, by the display panel, a noise signal in the first mode, wherein the noise signal has a noise cycle, and a phase difference between charging enabling levels provided by the driving signal lines corresponding to the first sub-pixel and the second sub-pixel is non-integer times of the noise cycle.

A third aspect of the present disclosure provides a display apparatus. The display apparatus includes the display panel described in the first aspect.

BRIEF DESCRIPTION OF DRAWINGS

In order to more clearly explain the embodiments of the present disclosure or the technical solution in the related art, the drawings to be used in the description of the embodiments or the related art will be briefly described below. Obviously, the drawings in the following description are some embodiments of the present disclosure. For those skilled in the art, other drawings may also be obtained based on these drawings without paying any creative labor.

DESCRIPTION OF EMBODIMENTS

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiment of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

Figure 1:
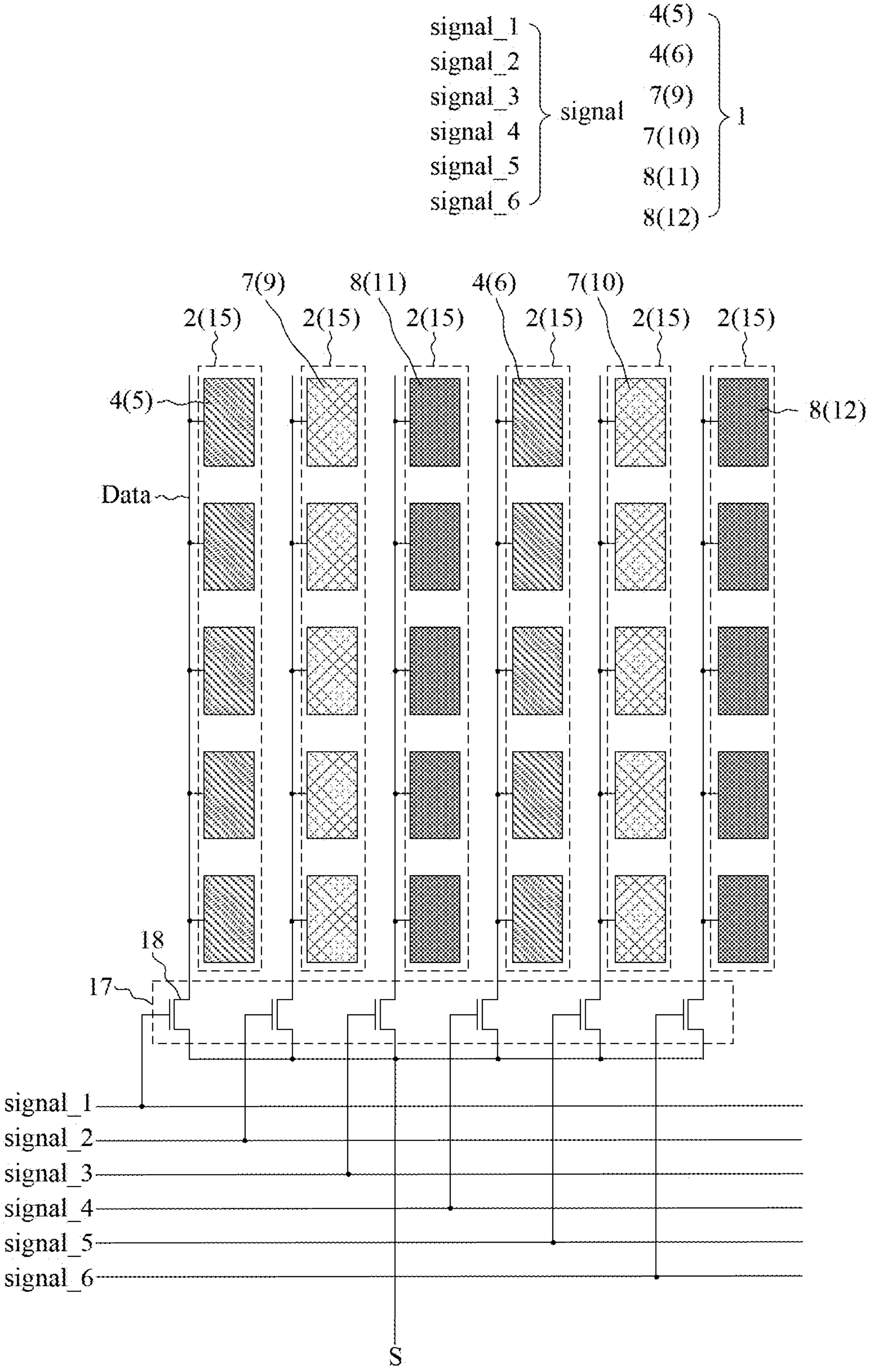
FIG. 1 is a structural schematic diagram of a display panel according to an embodiment of the present disclosure.
Figure 2:
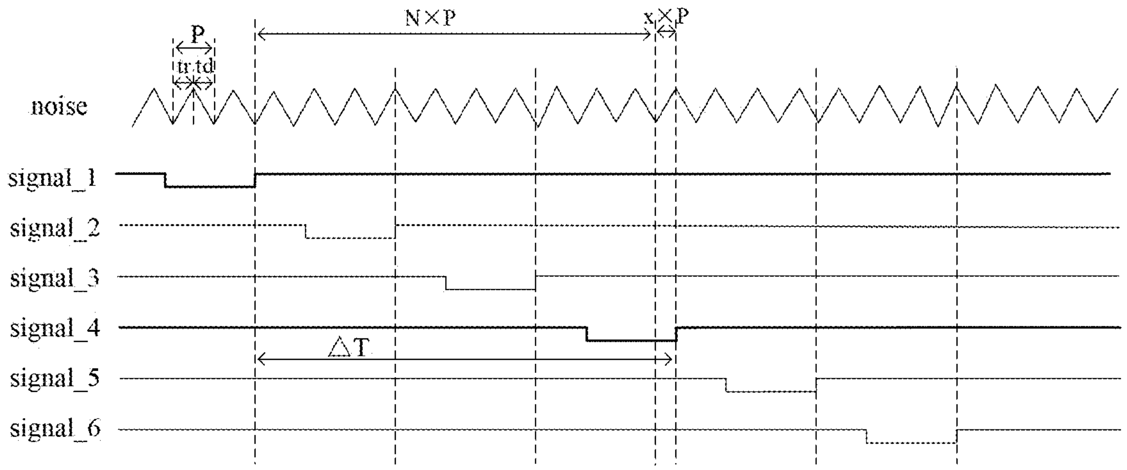
FIG. 2 is a sequence chart of signals provided by multiple driving signal lines in FIG. 1 in a first mode according to an embodiment of the present disclosure.

An embodiment of the present disclosure provides a display panel. As shown in FIG. 1 and FIG. 2, FIG. 1 is a structural schematic diagram of the display panel according to an embodiment of the present disclosure, and FIG. 2 is a sequence chart of signals provided by multiple driving signal lines (shown by 'signal') in FIG. 1 in a first mode. The display panel includes sub-pixels 1, multiple pixel groups 2, and multiple driving signal lines. For convenience of understanding, in the drawings of the present disclosure, the driving signal lines are represented by reference signs signal_1 to signal_n, respectively, but a value of n varies depending on a different structures of the display panel shown in the drawings.

The pixel group 2 includes multiple sub-pixels 1, and an arrangement direction of the pixel group 2 intersects an arrangement direction of the sub-pixel 1 in the pixel group 2.

One driving signal line corresponds to the sub-pixels 1 in at least one of the pixel groups 2, and multiple driving signal lines sequentially output a charging enabling level in a first order to drive the corresponding pixel groups 2. In the drawings of the present disclosure, an example in which the charging enabling level is a low level is used for illustration. In other optional embodiments, the charging enabling level can alternatively be a high level.

The display panel further includes data lines (shown by 'Data') electrically connected to the sub-pixels 1. When the driving signal line provides the charging enabling level, a drive chip provides a data voltage for the data line to charge the data line. Alternatively, when the driving signal line provides the charging enabling level, a data voltage transmitted on the data line is written into the sub-pixel 1 to charge the sub-pixel 1. However, when the driving signal line provides the charging enabling level, no matter whether the data line or the sub-pixel 1 is charged, if the data voltage fluctuates, actual brightness of the sub-pixel 1 is ultimately affected.

The sub-pixels 1 include a first color sub-pixel 4 configured to emit first color light. The first color sub-pixel 4 includes a first sub-pixel 5 and a second sub-pixel 6. The first sub-pixel 5 and the second sub-pixel 6 are located in different pixel groups 2 and correspond to different driving signal lines. Moreover, the first sub-pixel 5 and the second sub-pixel 6 are arranged along the arrangement direction of the pixel group 2, and the second sub-pixel 6 and the first sub-pixel 5 are spaced by other first color sub-pixels 4 whose number is not greater than a preset number. In FIG. 1, the first sub-pixel 5 corresponds to the driving signal line signal_1, and the second sub-pixel 6 corresponds to the driving signal line signal_4. However, in different drawings, the reference signs of the driving signal lines corresponding to the first sub-pixel 5 and the second sub-pixel 6 can be different.

The display panel has a first mode. In the first mode, the display panel receives a noise signal (shown by 'noise'). The noise signal has a noise cycle P, and a phase difference between charging enabling levels provided by the signal_1 corresponding to the first sub-pixel 5 and the signal_4 corresponding to the second sub-pixel 6 is non-integer times of the noise cycle P.

The noise signal mentioned above can be a high-frequency signal such as an electromagnetic signal or a radio frequency (RF) signal. In the first mode, the display panel needs to receive the periodic noise signal to achieve a specific function. For example, when a mobile phone uses a near field communication (NFC) technology to swipe a card at a card reader, the mobile phone receives an RF signal sent by the card reader to achieve a card swiping function. Alternatively, when the mobile phone uses a wireless charging technology for charging, the mobile phone receives an electromagnetic signal sent by a charging apparatus to achieve a charging function.

If the noise signal is received when the display panel displays an image, the noise signal affects stability of the data voltage, thereby affecting normal charging of the data line or the sub-pixel 1.

For example, when the driving signal line provides the charging enabling level, the drive chip charges the data line.

In this case, when the driving signal line provides the charging enabling level, the drive chip continuously transmits the data voltage to the data line to charge the data line. In this charging process, if the display panel receives the noise signal, the noise signal causes interference to the charging of the data line. Because the drive chip has no sufficient driving force to fully resist this interference, the data voltage fluctuates under the interference of the noise signal.

The noise signal is periodic. Therefore, in the entire charging process of the data line, the data voltage positively and negatively changes around a standard voltage value under an impact from the noise signal. However, in the fluctuation process, the data voltage also returns to the standard voltage value for multiple times. When the data voltage returns to the standard voltage value, it can be considered that a cumulated impact of the noise signal on the data voltage in an early stage has been offset. Therefore, an impact of the noise signal on the data voltage during a short time segment close to an end time point of the charging (which can alternatively be understood as a short time segment from the last time the data voltage returns to the standard voltage value in the fluctuation process to the end time point of the charging) determines whether the data voltage retained on the data line after the charging experiences a positive or negative fluctuation.

For example, at the end time point of the charging, if the noise signal shows an upward trend tr, the noise signal no doubt has a positive impact on the data voltage in the short time segment close to the end time point of the charging. Therefore, the data voltage retained on the data line after the charging experiences the positive fluctuation compared with the standard voltage value. However, at the end time point of the charging, if the noise signal shows a downward trend td, the noise signal probably has a negative impact the data voltage in the short time segment close to the end time point of the charging. Therefore, the data voltage retained on the data line after the charging experiences the negative fluctuation compared with the standard voltage value.

After the charging is completed, a deviated data voltage remains on the data line until it is written into the sub-pixel 1. Therefore, the deviated data voltage ultimately affects the charging of the sub-pixel 1, causing brightness of the sub-pixel 1 to deviate from its standard brightness.

Assuming that the standard voltage value is V1 and the data voltage retained on the data line after the charging is V1', in a time segment from the end of charging the data line to before the charging of the sub-pixel 1, although the data voltage V1' retained on the data line continues to be interfered with by the noise signal, the data voltage in this time segment fluctuates back and forth based on the data voltage V1'. If there is a significant difference between data voltages V1' corresponding to two sub-pixels 1, when two data voltages V1' are written into the sub-pixels 1 after fluctuating subsequently, a difference between written voltage values also is significant. Therefore, at the end time point of charging the data line, a deviation degree of the data voltage V1' from the standard voltage value V1 determines a deviation degree of the brightness of the sub-pixel 1 to a great extent.

To sum up, in a process of displaying the image on the display panel, if the noise signal is received, the noise signal causes a charging data voltage on the data line to fluctuate, which further results in a deviation of the actual brightness of the sub-pixel 1.

Based on the above problems, a further research by the inventor shows that for adjacent same-color sub-pixels, if brightness of at least one of these sub-pixels 1 experiences a maximum positive deviation or a maximum negative deviation, the brightness deviations of these adjacent same-color sub-pixels are more likely to be detected by a human eye, such that the brightness deviations of these adjacent same-color sub-pixels can be recognized as obvious ripples by human eyes.

In some embodiments of the present disclosure, an impact of a brightness deviation of the sub-pixel 1 due to the noise signal on an image observed by human eyes can be effectively reduced by adjusting a phase difference between charging enabling levels provided by driving signal lines corresponding to same-color sub-pixels 1 that are relatively close to each other.

In some embodiments of the present disclosure, both the first sub-pixel 5 and the second sub-pixel 6 are first color sub-pixels 4 and are spaced by the other first color sub-pixels 4 whose number is not greater than the preset number, in other words, the first sub-pixel 5 and the second sub-pixel 6 are adjacent same-color sub-pixels.

In the first mode, when the phase difference ΔT between the charging enabling levels provided by the signal_1 corresponding to the first sub-pixel 5 and the signal_4 corresponding to the second sub-pixel 6 is non-integer times of the noise cycle P, positions of the noise signal that correspond to end time points of two charging enabling levels are different, which can prevent the end time points of two charging enabling levels from corresponding to a top (or bottom) point of the noise signal simultaneously. This further avoids maximum positive fluctuations (or maximum negative fluctuations) of data voltages corresponding to these two adjacent same-color sub-pixels, thereby preventing two adjacent same-color sub-pixels from being maximally bright (or maximally dark) simultaneously.

Figure 3:
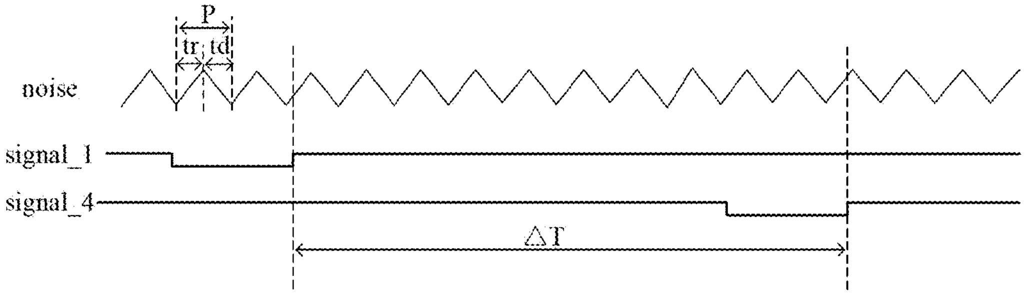
FIG. 3 is a sequence chart of charging enabling levels provided by driving signal lines corresponding to a first sub-pixel and a second sub-pixel in FIG. 1 according to an embodiment of the present disclosure.
Figure 4:
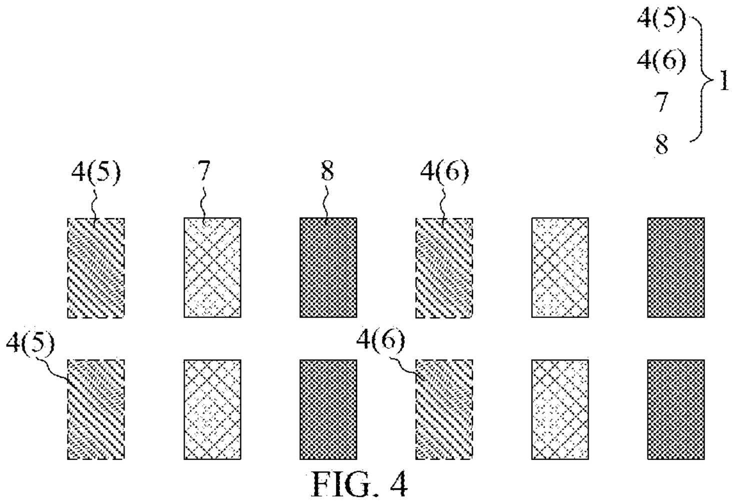
FIG. 4 is a schematic diagram of brightness of a sub-pixel in FIG. 3 according to an embodiment of the present disclosure.

For example, in one case, as shown in FIG. 3 and FIG. 4, FIG. 3 is a sequence chart of the charging enabling levels provided by the signal_1 corresponding to the first sub-pixel 5 and the signal_4 corresponding to the second sub-pixel 6 in FIG. 1, and FIG. 4 is a schematic diagram of the brightness of the sub-pixel 1 in FIG. 3. At the end time point of the charging enabling level provided by the signal_1 corresponding to the first sub-pixel 5 and at the end time point of the charging enabling level provided by the signal_4 corresponding to the second sub-pixel 6, the noise signal shows the upward trend tr. However, the positions corresponding to the end time points of two charging enabling levels in the upward trend tr of the noise signal are different. The position, of the noise signal, corresponding to the end time point of the charging enabling level of the signal_1 is closer to the bottom point, while the position, of the noise signal, corresponding to the end time point of the charging enabling level of the signal_4 is closer to the top point of the noise signal. This causes the noise signal to have a greater positive impact on the data voltage corresponding to the second sub-pixel 6 before the end time point of the charging enabling level of the signal_4, resulting in a greater positive deviation of brightness of the second sub-pixel 6.

Figure 5:
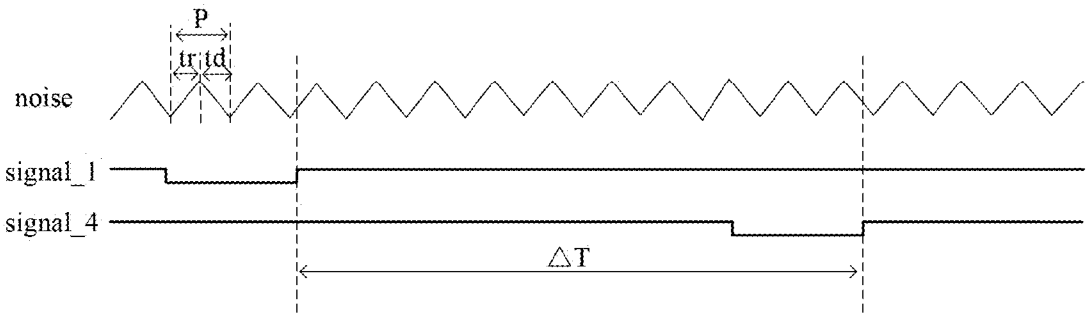
FIG. 5 is a sequence chart of charging enabling levels provided by driving signal lines corresponding to a first sub-pixel and a second sub-pixel in FIG. 1 according to another embodiment of the present disclosure.
Figure 6:
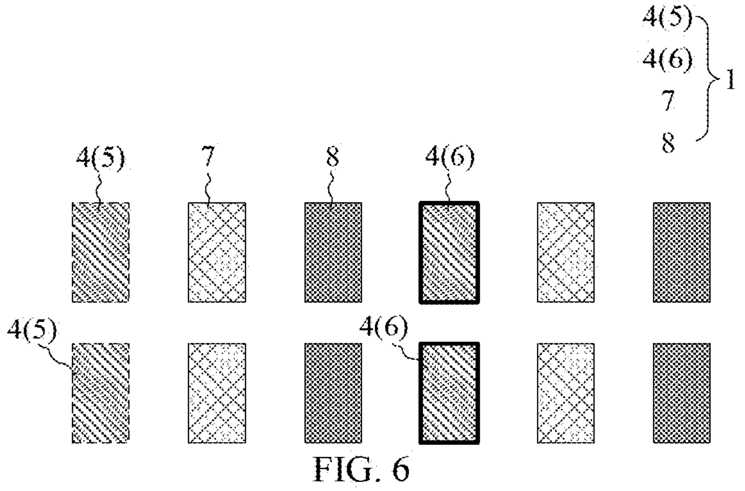
FIG. 6 is a schematic diagram of brightness of a sub-pixel in FIG. 5 according to an embodiment of the present disclosure.

Alternatively, in another case, as shown in FIG. 5 and FIG. 6, FIG. 5 is another sequence chart of the charging enabling levels provided by the signal_1 corresponding to the first sub-pixel 5 and the signal_4 corresponding to the second sub-pixel 6 in FIG. 1, and FIG. 6 is a schematic diagram of the brightness of the sub-pixel 1 in FIG. 5. At the end time point of the charging enabling level provided by the signal_1 corresponding to the first sub-pixel 5, the noise signal shows the upward trend tr, while at the end time point of the charging enabling level provided by the signal_4 corresponding to the second sub-pixel 6, the noise signal shows the downward trend td. In this case, before charging of a data line connected to the first sub-pixel 5 ends, the noise signal has a positive impact on a data voltage on the data line, while before charging of a data line connected to the second sub-pixel 6 ends, the noise signal has a negative impact on a data voltage on the data line. As a result, the first sub-pixel 5 is bright and the second sub-pixel 6 is dark.

For clarity, in the drawings of the present disclosure, the sub-pixel 1 is represented by a square. When the brightness of the sub-pixel 1 is expressed, a dotted block indicates high brightness of the sub-pixel 1, and a thick solid block indicates low brightness of the sub-pixel 1.

The embodiments of the present disclosure can achieve a controllable distribution of brightness of adjacent first color sub-pixels 4 by controlling a phase difference between charging enabling levels provided by driving signal lines corresponding to the adjacent first color sub-pixels 4 to be non-integer times of the noise cycle P, to prevent two adjacent first color sub-pixels 4 from continuously being maximally bright (or maximally dark). In this way, when the display panel displays a first solid-color image or multi-color image, brightness deviations of the adjacent first color sub-pixels 4 are not recognized as obvious stripes by human eyes, which can effectively reduce an impact of the brightness deviation of the first color sub-pixel 4 due to the noise signal on the image observed by human eyes. Moreover, in addition to effectively reducing an impact of the noise signal noise on display, the above structure requires no shielding layer, thus overcoming the adverse problems caused by a shielding layer as described in BACKGROUND.

In addition, in the embodiments of the present disclosure, a timing sequence of the driving signal line in the display panel can be adjusted to ensure that the phase difference between the charging enabling levels and the noise cycle P meet the above relationship, or a timing sequence of the noise signal provided by an interference source can be adjusted to match a timing sequence of the driving signal line in the display panel to ensure that the phase difference between the charging enabling levels and the noise cycle P meet the above relationship.

In some embodiments of the present disclosure, referring to FIG. 1 and FIG. 2, $\Delta T=(N+x)\times P$. In the above formula, $\Delta T$ represents a phase difference between the charging enabling levels provided by the signal_1 corresponding to the first sub-pixel 5 and the signal_4 corresponding to the second sub-pixel 6 in the first mode, P represents a noise cycle, N is an integer greater than or equal to 0, and $0.4\leq x\leq 0.6$.

In the first mode, when the $\Delta T$ and the P meet the above relationship, after noise cycles P of an integer number are removed, the phase difference between two charging enabling levels is still about half a noise cycle P, resulting in a significant difference between the positions of the noise signal that correspond to the end time points of two charging enabling levels. For example, if the end time point of one charging enabling level corresponds to the upward trend tr of the noise signal, the end time point of the other charging enabling level corresponds to the downward trend td of the noise signal. In this case, impacts of the noise signal on brightness of the first sub-pixel 5 and the second sub-pixel 6 are opposite, causing one of two first color sub-pixels 4 to be bright and the other to be dark. In this way, the first sub-pixel 5 and the second sub-pixel 6 can be controlled to follow a bright-dark distribution, and a brightness difference between these two sub-pixels is compensated visually, such that equivalent brightness of two sub-pixels tends towards target brightness and thus cannot be recognized as ripples by human eyes to a greater extent.

Further, referring to FIG. 2, x can be set to 0.5.

In this case, after the noise cycles P of the integer number are removed, the phase difference between two charging enabling levels is still about half a noise cycle P. Therefore, when the end time points of two charging enabling levels correspond to the upward trend tr and the downward trend td of the noise signal respectively, there will also be a case in which the end time point of one charging enabling level corresponds to the top point of the noise signal and the end time point of the other charging enabling level corresponds to the bottom point of the noise signal. For example, referring to FIG. 2, the end time point of the charging enabling level provided by the signal_1 corresponding to the first sub-pixel 5 corresponds to the bottom point of the noise signal. In this case, the noise signal has a maximum negative impact on actual brightness of the first sub-pixel 5, such that the first sub-pixel 5 reaches a most dark state. However, the end time point of the charging enabling level provided by the signal_4 corresponding to the second sub-pixel 6 corresponds to the top point of the noise signal. In the case, the noise signal has a maximum positive impact on actual brightness of the second sub-pixel 6, such that the second sub-pixel 6 reaches a bright state at the greatest extent. In this case, the visual brightness difference between the first sub-pixel 5 and the second sub-pixel 6 is greater. The brightness difference is easier to be compensated and less easily recognized by human eyes.

In some embodiments of the present disclosure, the preset number is 1, and the second sub-pixel 6 and the first sub-pixel 5 are spaced by at most one other first color sub-pixel 4.

In one configuration manner, referring to FIG. 1, the first sub-pixel 5 and the second sub-pixel 6 are not spaced by any other first color sub-pixel 4. In this case, the first sub-pixel 5 and the second sub-pixel 6 are adjacent first color sub-pixels 4. Adjusting a timing sequence of the corresponding driving signal lines of the first sub-pixel 5 and the second sub-pixel 6 can more effectively prevent human eyes from recognizing continuous ripples.

Figure 7:
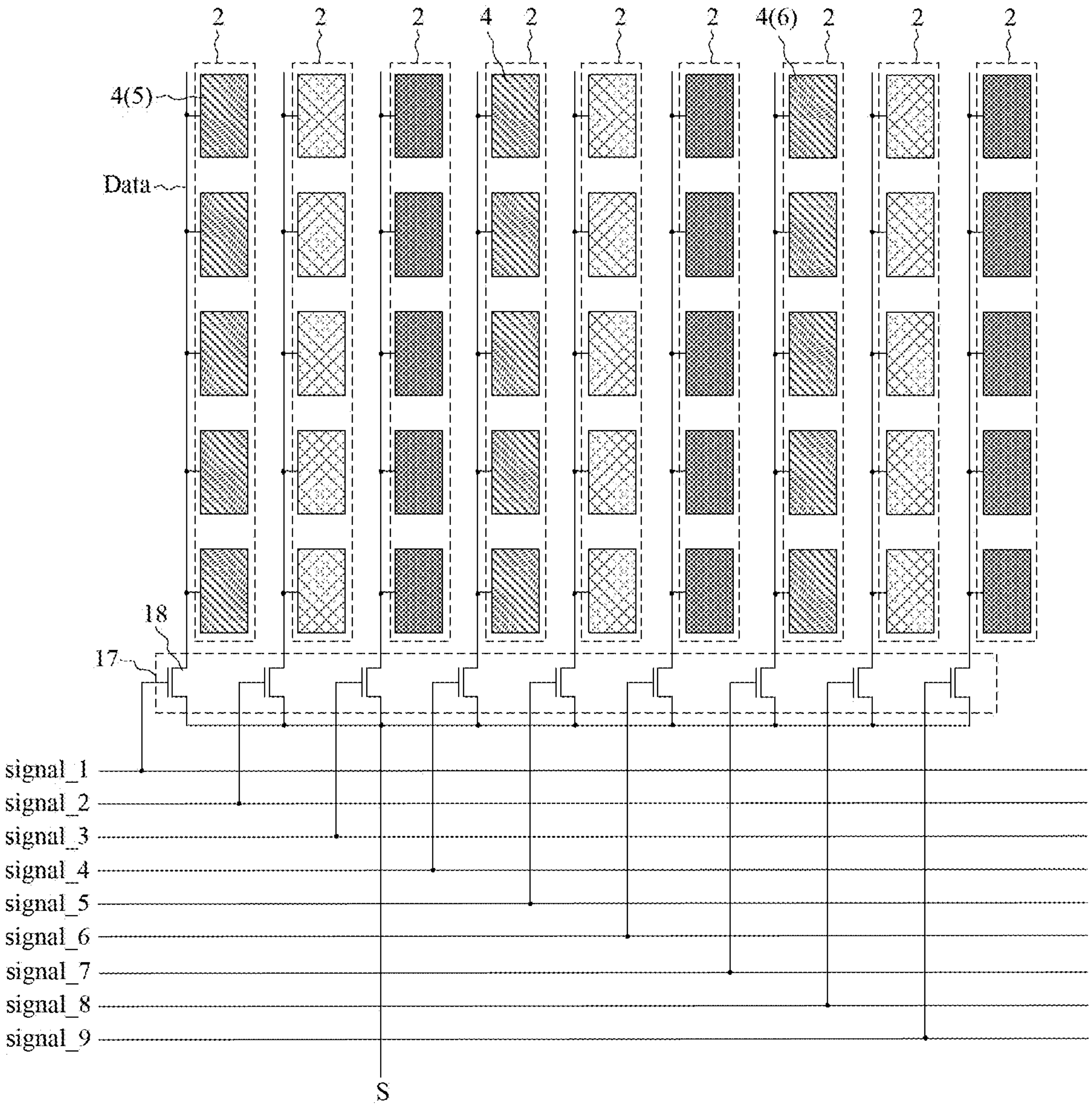
FIG. 7 is a structural schematic diagram of a display panel according to another embodiment of the present disclosure.
Figure 8:
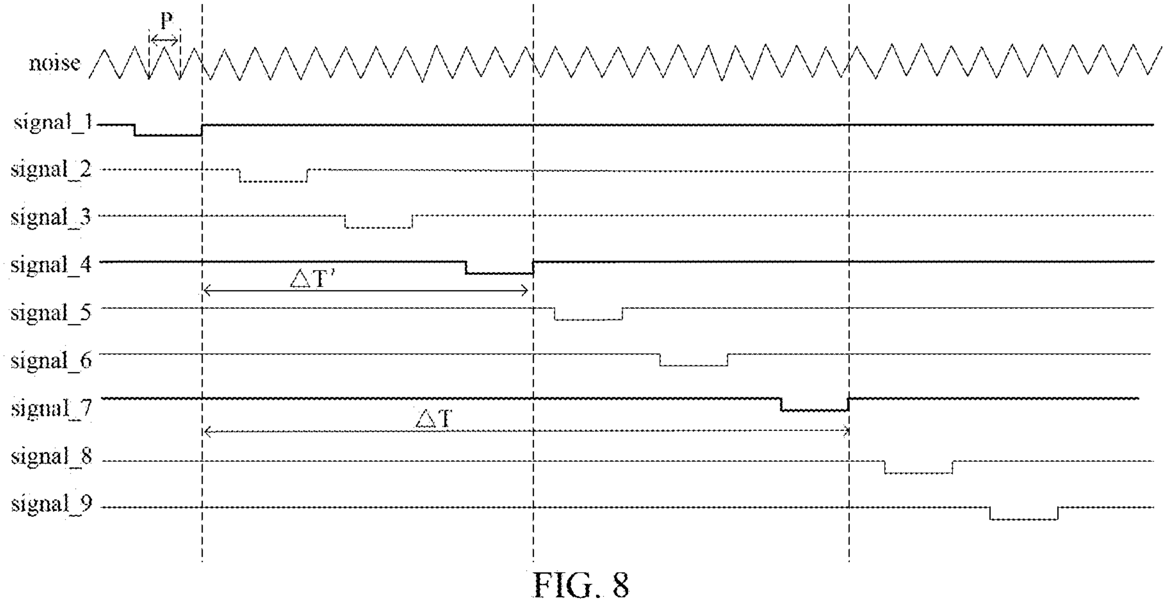
FIG. 8 is a sequence chart of driving signals provided by multiple driving signal lines in FIG. 7 in a first mode according to an embodiment of the present disclosure.
Figure 9:
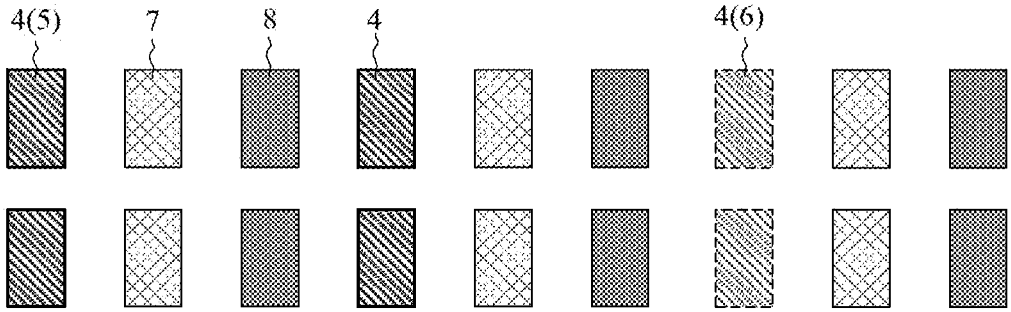
FIG. 9 is a schematic diagram of brightness of a sub-pixel in FIG. 8 according to an embodiment of the present disclosure.

Alternatively, in another configuration manner, as shown in FIG. 7 to FIG. 9, FIG. 7 is another structural schematic diagram of the display panel according to an embodiment of the present disclosure, FIG. 8 is a sequence chart of driving signals provided by multiple driving signal lines in FIG. 7 in the first mode, and FIG. 9 is a schematic brightness diagram of the sub-pixel 1 in FIG. 8. The second sub-pixel 6 and the first sub-pixel 5 can alternatively be spaced by one other first color sub-pixel 4. In this structure, the first sub-pixel 5 is still close to the second sub-pixel 6, and they can still be considered as adjacent same-color sub-pixels. For example, the first color sub-pixel 4 between the first sub-pixel 5 and the second sub-pixel 6 has same brightness as the first sub-pixel 5. Even if a phase difference ΔT' between charging enabling levels provided by the signal_4 corresponding to the first color sub-pixel 4 and the signal_1 corresponding to the first sub-pixel 5 is integer times of the noise cycle P, such that the first color sub-pixel 4 and the first sub-pixel 5 have the same brightness and are both dark, a brightness difference between a pattern in which two first color sub-pixels 4 have the same overall brightness and are dark and a pattern in which the second sub-pixel 6 is bright is also far from being distinguished by human eyes. Therefore, it is still possible to prevent the brightness difference between these first color sub-pixels 4 from being recognized as stripes by human eyes.

Figure 10:
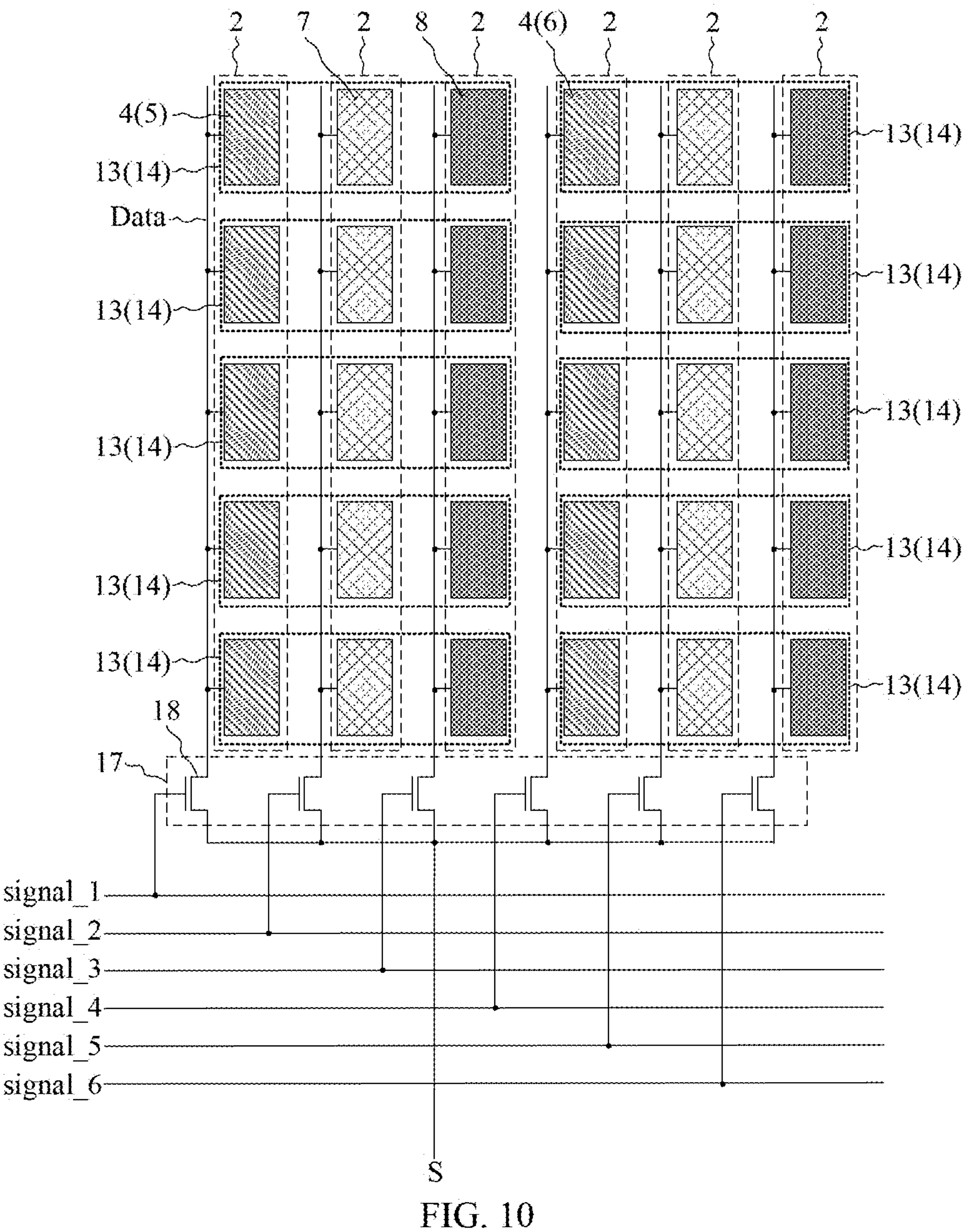
FIG. 10 is a structural schematic diagram of a display panel according to another embodiment of the present disclosure.
Figure 11:
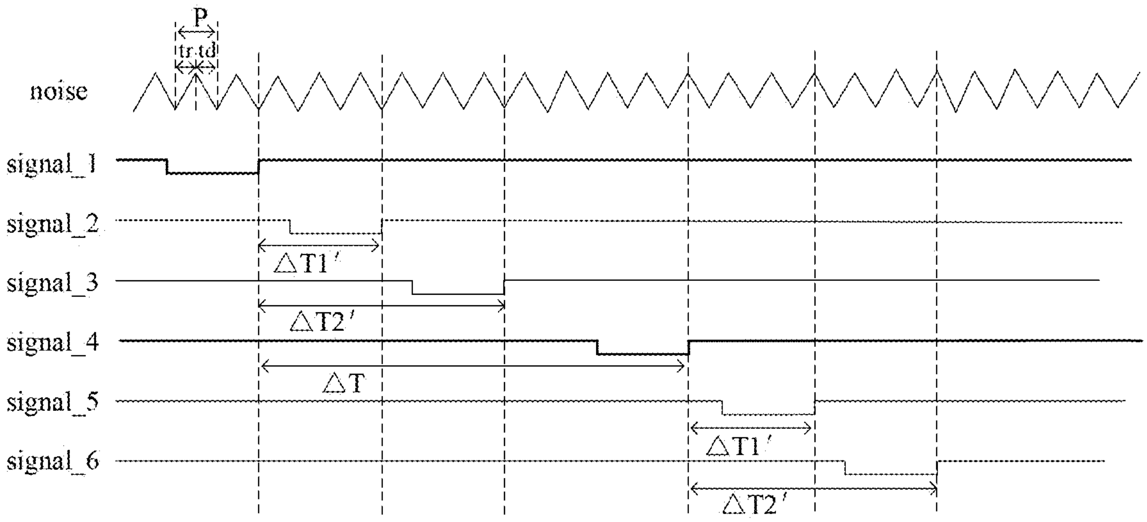
FIG. 11 is a sequence chart of driving signals provided by multiple driving signal lines in FIG. 10 in a first mode according to an embodiment of the present disclosure.
Figure 12:
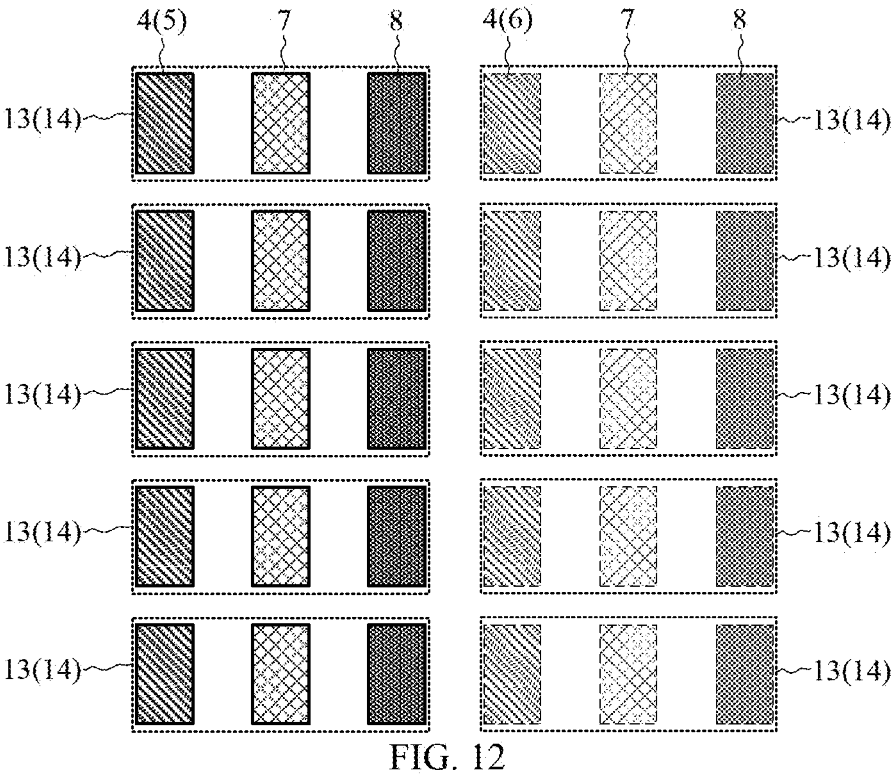
FIG. 12 is a schematic diagram of brightness of a sub-pixel in FIG. 11 according to an embodiment of the present disclosure.

In some embodiments of the present disclosure, as shown in FIG. 10 to FIG. 12, FIG. 10 is still another structural schematic diagram of the display panel according to an embodiment of the present disclosure, FIG. 11 is a sequence chart of driving signals provided by multiple driving signal lines in FIG. 10 in the first mode, and FIG. 12 is a schematic brightness diagram of the sub-pixel 1 in FIG. 11. The sub-pixel 1 further includes a second color sub-pixel 7 and a third color sub-pixel 8. The second color sub-pixel 7 is configured to emit second color light, and the third color sub-pixel 8 is configured to emit third color light.

The display panel further includes multiple pixels 13 that include the first color sub-pixel 4, the second color sub-pixel 7, and the third color sub-pixel 8. The pixels 13 include a first pixel 14. The first color sub-pixel 4, the second color sub-pixel 7, and the third color sub-pixel 8 in the first pixel 14 are located in different pixel groups 2 and correspond to different driving signal lines.

In the first mode, a phase difference ΔT1' between charging enabling levels provided by driving signal lines corresponding to the first color sub-pixel 4 and the second color sub-pixel 7 in the first pixel 14 is [M−0.1, M+0.1] times of the noise cycle P, and M is a positive integer; and/or a phase difference ΔT2' between charging enabling levels provided by driving signal lines corresponding to the first color sub-pixel 4 and the third color sub-pixel 8 in the first pixel 14 is [R−0.1, R+0.1] times of the noise cycle P, and R is a positive integer. FIG. 11 illustrates that ΔT1' and ΔT2' each are integer times of the noise cycle P.

Based on the above configuration manner, for one first pixel 14, the phase difference ΔT1' between the charging enabling levels provided by the driving signal lines (such as 'signal_1' and 'signal_2') respectively corresponding to the first color sub-pixel 4 and the second color sub-pixel 7 in the first pixel 14 tends to be integer times of the noise cycle P; and in this case, the noise signal has similar impacts on the brightness of the first color sub-pixel 4 and brightness of the second color sub-pixel 7, for example, can make these two different color sub-pixels 1 dark; and/or the phase difference ΔT2' between the charging enabling levels provided by the driving signal lines (such as 'signal_1' and 'signal_3') respectively corresponding to the first color sub-pixel 4 and the third color sub-pixel 8 in the first pixel 14 tends to be integer times of the noise cycle P, and in this case, the noise signal also has similar impacts on the brightness of the first color sub-pixel 4 and brightness of the third color sub-pixel 8, for example, can make these two different color sub-pixels 1 dark.

In this way, the noise signal has a same-direction impact on brightness of at least two different color sub-pixels 1 in the first pixel 14, which can effectively improve color cast of the first pixel 14 itself. Especially when the sub-pixels 1 of three colors in the first pixel 14 are all dark or bright simultaneously, a more significant improvement effect is achieved.

In some embodiments of the present disclosure, referring to FIG. 1 and FIG. 2 again, the sub-pixels 1 further includes second color sub-pixels 7 and third color sub-pixels 8.

The second color sub-pixel 7 includes third sub-pixels 9 and fourth sub-pixels 10. The third sub-pixels 9 and the fourth sub-pixels 10 are located in different pixel groups 2 and correspond to different driving signal lines. In addition, the third sub-pixels 9 and the fourth sub-pixels 10 are arranged along the arrangement direction of the pixel group 2, and the third sub-pixels 9 and the fourth sub-pixels 10 are spaced by other second color sub-pixels 7 whose number is less than the preset number. In FIG. 1, the third sub-pixels 9 correspond to the driving signal line signal_2, and the fourth sub-pixels 10 correspond to the driving signal line signal_5.

In some embodiments of the present disclosure, the preset number can be 1. FIG. 1 is illustrated by using an example in which the third sub-pixel 9 and the fourth sub-pixel 10 are not spaced by any other second color sub-pixel 7 (the preset number is 0). In some embodiments of the present disclosure, the third sub-pixel 9 and the fourth sub-pixel 10 can alternatively be spaced by one other second color sub-pixel 7.

In the first mode, a phase difference between charging enabling levels provided by the signal_2 corresponding to the third sub-pixel 9 and the signal_5 corresponding to the fourth sub-pixel 10 is non-integer times of the noise cycle P.

In the first mode, the present disclosure can achieve a controllable distribution of brightness of adjacent second color sub-pixels 7 by controlling a phase difference between charging enabling levels provided by driving signal lines corresponding to the adjacent second color sub-pixels 7 to be non-integer times of the noise cycle P, to prevent two adjacent second color sub-pixels 7 from continuously being maximally bright (or maximally dark). This is similar for the first color sub-pixel 4. In this way, when the display panel displays a second solid-color image or multi-color image, brightness deviations of the adjacent second color sub-pixels 7 are not recognized as obvious stripes by human eyes, which can effectively minimize an impact of the brightness deviation of the second color sub-pixel 7 due to the noise signal on the image observed by human eyes.

The third color sub-pixels 8 include fifth sub-pixels 11 and sixth sub-pixels 12. The fifth sub-pixels 11 and the sixth sub-pixels 12 are located in different pixel groups 2 and correspond to different driving signal lines. In addition, the fifth sub-pixel 11 and the sixth sub-pixel 12 are arranged along the arrangement direction of the pixel group 2, and the fifth sub-pixel 11 and the sixth sub-pixel 12 are spaced by other third color sub-pixels 8 whose number is less than the preset number. In FIG. 1, the fifth sub-pixels 11 correspond to the driving signal line signal_3 and the sixth sub-pixels 12 correspond to the driving signal line signal_6.

In some embodiments of the present disclosure, the preset number can be 1. FIG. 1 is illustrated by using an example in which the fifth sub-pixel 11 and the sixth sub-pixel 12 are not spaced by any third color sub-pixel 8 (the preset number is 0). In some embodiments of the present disclosure, the fifth sub-pixel 11 and the sixth sub-pixel 12 can alternatively be spaced by one other third color sub-pixel 8.

In the first mode, a phase difference between charging enabling levels provided by the signal_3 corresponding to the fifth sub-pixel 11 and the signal_6 corresponding to the sixth sub-pixel 12 is non-integer times of the noise cycle P.

Similar to the first color sub-pixel 4, in the first mode, the embodiments of the present disclosure can achieve a controllable distribution of brightness of adjacent third color sub-pixels 8 by controlling a phase difference between charging enabling levels provided by driving signal lines corresponding to the adjacent third color sub-pixels 8 to be non-integer times of the noise cycle P, preventing two adjacent third color sub-pixels 8 from continuously being maximally bright (or maximally dark). In this way, when the display panel displays a third solid-color image or multi-color image, brightness deviations of the adjacent third color sub-pixels 8 are not recognized as obvious stripes by human eyes, which can effectively reduce an impact of the brightness deviation of the third color sub-pixels 8 due to the noise signal on the image observed by human eyes.

Figure 13:
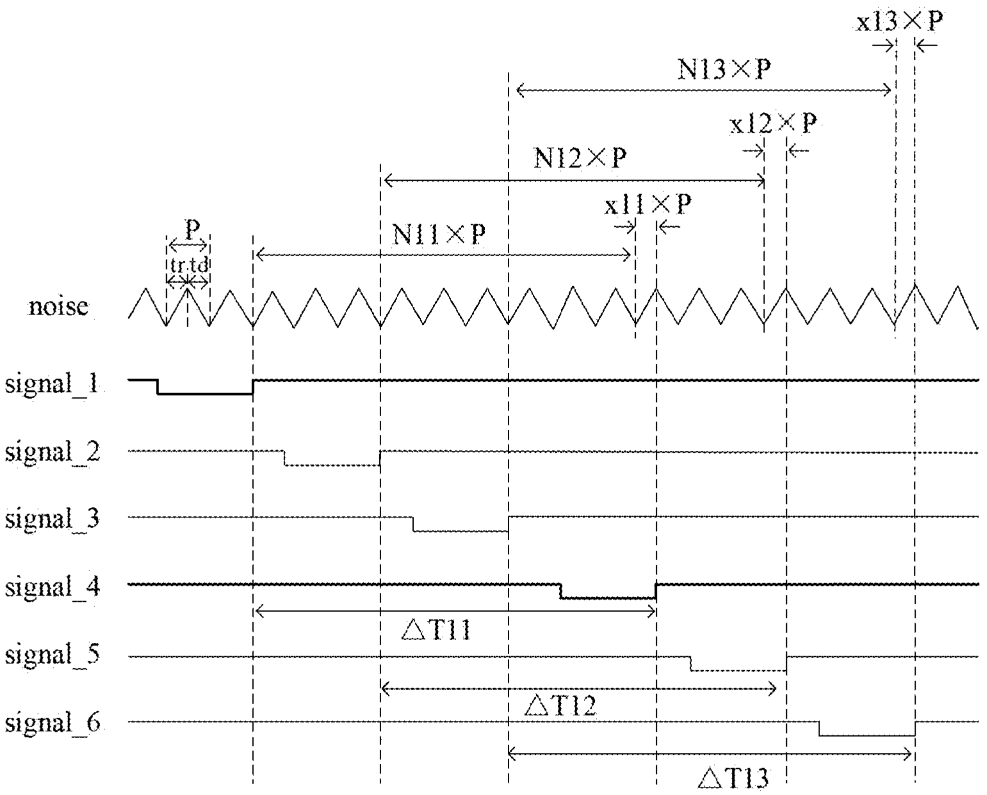
FIG. 13 is a sequence chart of driving signals provided by multiple driving signal lines in FIG. 1 in a first mode according to another embodiment of the present disclosure.

In some embodiments of the present disclosure, FIG. 13 is another sequence chart of the driving signals provided by the driving signal lines in FIG. 1 in the first mode. Referring to FIG. 1 and FIG. 13, in the first mode:

the phase difference between the charging enabling levels provided by the signal_1 corresponding to the first sub-pixel 5 and the signal_4 corresponding to the second sub-pixel 6 is $\Delta T11$, and $\Delta T11=(N11+x11)\times P$, where P represents the noise cycle, N11 is an integer greater than or equal to 0, and $0<x11<1$;

the phase difference between the charging enabling levels provided by the signal_2 corresponding to the third sub-pixel 9 and the signal_5 corresponding to the fourth sub-pixel 10 is $\Delta T12$, and $\Delta T12=(N12+x12)\times P$, where N12 is an integer greater than or equal to 0, and $0<x12<1$; and the phase difference between the charging enabling levels provided by the signal_3 corresponding to the fifth sub-pixel 11 and the signal_6 corresponding to the sixth sub-pixel 12 is $\Delta T13$, and $\Delta T13=(N13+x13)\times P$, where N13 is an integer greater than or equal to 0, and $0<x13<1$.

In the above formulas, $x11=x12=x13$.

In this way, brightness differences of adjacent same-color sub-pixels in the sub-pixel 1 of each color can tend to be consistent, thereby uniformly adjusting brightness differences of different sub-pixels 1 with same color. Moreover, in this mode, a timing sequence design of the charging enabling level is also simpler. For example, referring to FIG. 13, when $N11=N12=N13$, a time interval between the charging enabling levels provided by the signal_1 corresponding to the first sub-pixel 5 and the signal_4 corresponding to the second sub-pixel 6, a time interval between the charging enabling levels provided by the signal_2 corresponding to the third sub-pixel 9 and the signal_5 corresponding to the fourth sub-pixel 10, and a time interval between the charging enabling levels provided by the signal_3 corresponding to the fifth sub-pixel 11 and the signal_6 corresponding to the sixth sub-pixel 12 are also consistent.

Figure 14:
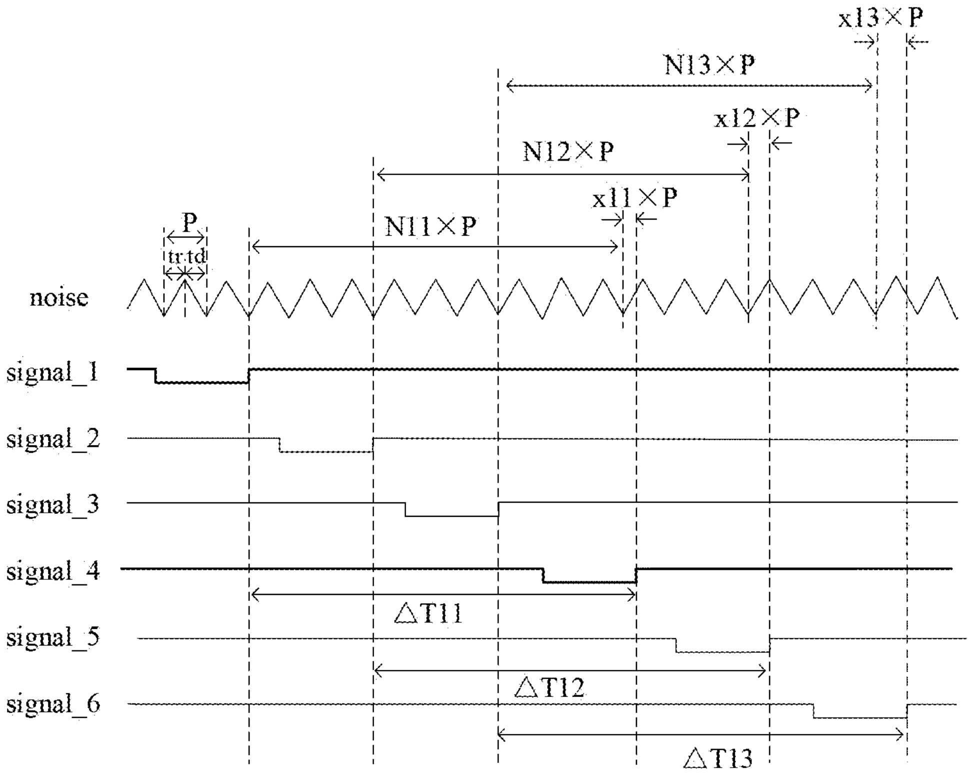
FIG. 14 is still another sequence chart of driving signals provided by multiple driving signal lines in FIG. 1 in a first mode according to an embodiment of the present disclosure.

In some embodiments of the present disclosure, FIG. 14 is still another sequence chart of the driving signals provided by the driving signal lines in FIG. 1 in the first mode. Referring to FIG. 1 and FIG. 14, in the first mode:

the phase difference between the charging enabling levels provided by the driving signal lines corresponding to the first sub-pixel 5 and the second sub-pixel 6 is $\Delta T11$, and $\Delta T11=(N11+x11)\times P$, where P represents the noise cycle, N11 is an integer greater than or equal to 0, and $0<x11<1$;

the phase difference between the charging enabling levels provided by the driving signal lines corresponding to the third sub-pixel 9 and the fourth sub-pixel 10 is $\Delta T12$, and $\Delta T12=(N12+x12)\times P$, where N12 is an integer greater than or equal to 0, and $0<x12<1$; and the phase difference between the charging enabling levels provided by the driving signal lines corresponding to the fifth sub-pixel 11 and the sixth sub-pixel 12 is $\Delta T13$, and $\Delta T13=(N13+x13)\times P$, where N13 is an integer greater than or equal to 0, and $0<x13<1$.

In the above formulas, at least two of x11, x12, and x13 are unequal to each other.

In this way, brightness differences of adjacent same-color sub-pixels 1 of at least two colors can be designed to be different, which can adaptively adjust, based on recognition capabilities of human eyes for different colors, values of x that correspond to different adjacent sub-pixels 1 with same color. For example, for a color that is more easily recognized by human eyes, a value of x that corresponds to adjacent same-color sub-pixels 1 of the color can be set to closer to 0.5 to increase a brightness difference between the adjacent same-color sub-pixels 1 of the color. This makes it easier to compensate for the brightness difference between adjacent same-color sub-pixels 1 of the color visually to minimize a risk of making the brightness difference between the adjacent same-color sub-pixels 1 of the color visible to human eyes to a greater extent.

Further, still referring to FIG. 14, when the first color sub-pixel 4 is a red sub-pixel, the second color sub-pixel 7 is a green sub-pixel, and the third color sub-pixel 8 is a blue sub-pixel, x11, x12, and x13 can be set to meet following conditions: $|x12-0.5|<|x11-0.5|$, and $|x12-0.5|<|x13-0.5|$.

Compared with red color and blue color, green color is more easily recognized by human eyes. Therefore, a brightness difference between adjacent green sub-pixels can be increased to a greater extent by setting x12 to closer to 0.5, thereby further preventing green stripe from being recognized by human eyes.

Figure 15:
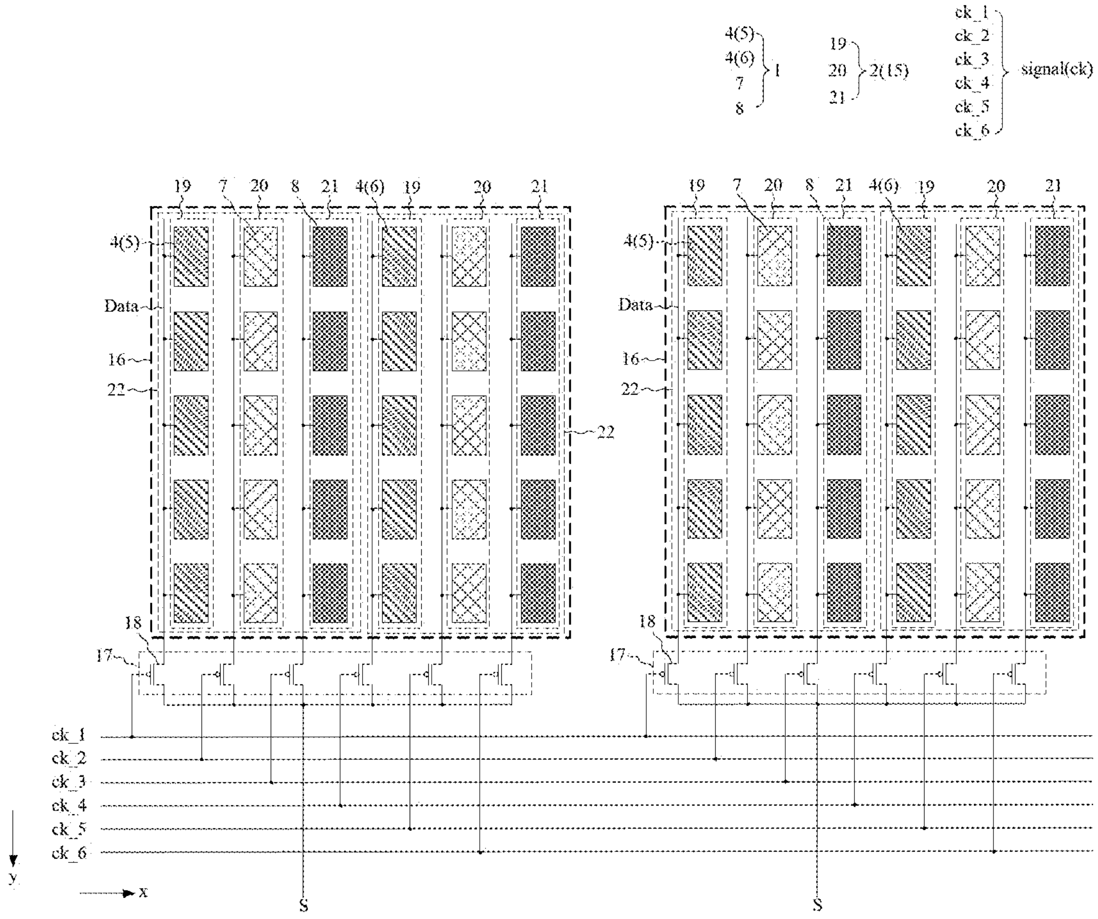
FIG. 15 is a structural schematic diagram of a display panel according to another embodiment of the present disclosure.
Figure 16:
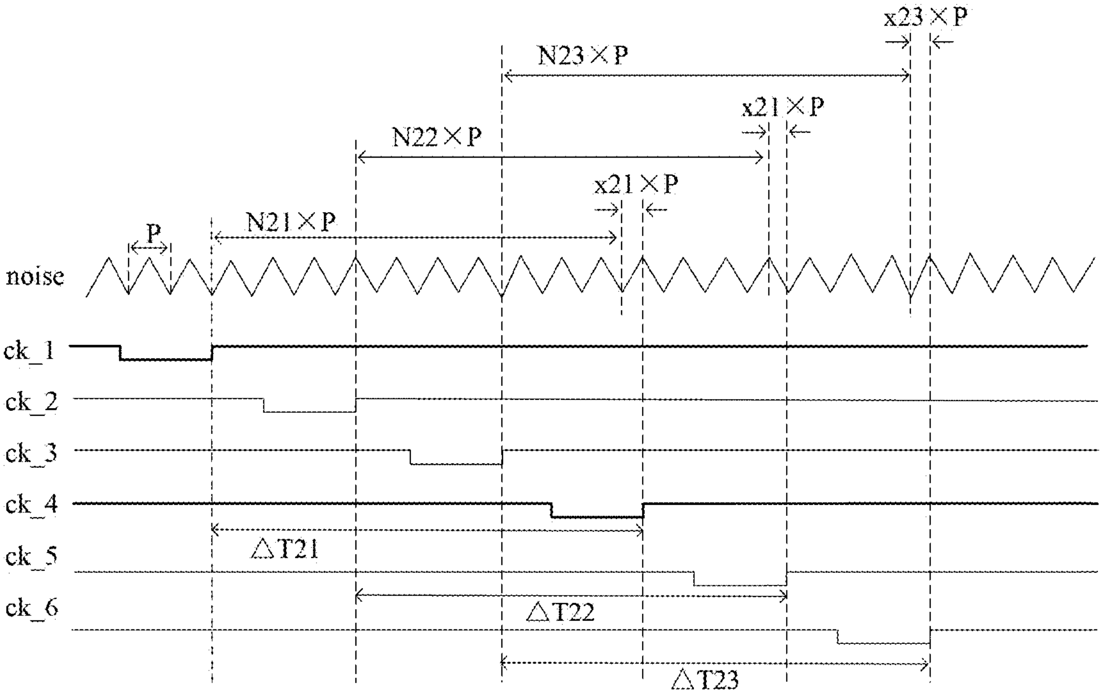
FIG. 16 is a sequence chart of clock signals provided by multiple clock signal lines in FIG. 15 in a first mode according to an embodiment of the present disclosure.
Figure 17:
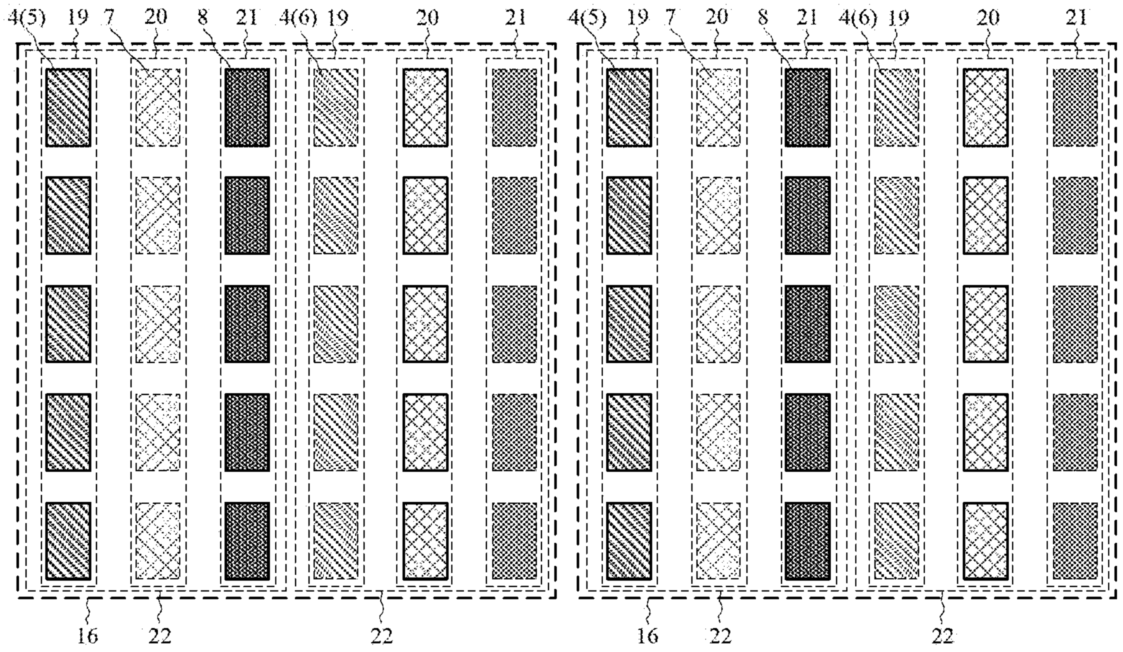
FIG. 17 is a schematic diagram of brightness of a sub-pixel in FIG. 16 according to an embodiment of the present disclosure.

In some embodiments of the present disclosure, referring to FIG. 1, as shown in FIG. 15 to FIG. 17, FIG. 15 is structural schematic diagram of the display panel according to another embodiment of the present disclosure, FIG. 16 is a sequence chart of clock signals provided by multiple clock signal lines in FIG. 15 in the first mode, and FIG. 17 is a schematic brightness diagram of the sub-pixel 1 in FIG. 16. The display panel further includes multiple pixel columns 15 arranged along a first direction x, multiple repeating units 16 arranged along the first direction x, and multiple switch circuits 17 corresponding to the repeating units 16.

The pixel column 15 includes multiple sub-pixels 1 arranged along a second direction y, the first direction x intersects the second direction y, and the repeating unit 16 includes multiple pixel columns 15. The switch circuit 17 includes multiple control switches 18. Control ends of the control switches 18 are respectively electrically connected to multiple clock signal lines (shown by 'ck'), input terminals of the control switches 18 are electrically connected to a source signal line (shown by 'S'), and output terminals of the control switches 18 are electrically connected to multiple pixel columns 15 in a corresponding repeating unit 16 through data lines (shown by 'Data'). For convenience of understanding, in the drawings of the present disclosure, the clock signal lines are represented by reference signs ck_1 to ck_n respectively, but a value of n varies depending on a structure of the display panel shown in the drawings.

The clock signal lines provide a clock enabling level in a first type of first order. When the clock signal line provides the clock enabling level, the control switch 18 connected to the clock signal line is conducted, and a data voltage on the source signal line is transmitted to the data line connected to the control switch 18 to charge the data line. The first sub-pixel 5 and the second sub-pixel 6 are located in different pixel columns 15 and correspond to different clock signal lines. In FIG. 15, the first sub-pixel 5 corresponds to the clock signal line ck_1, and the second sub-pixel 6 corresponds to the clock signal line ck_4. However, in different drawings, the clock signal lines corresponding to the first sub-pixel 5 and the second sub-pixel 6 can be represented by different reference signs.

In the first mode, a phase difference between clock enabling levels provided by ck_1 corresponding to the first sub-pixel 5 and ck_4 corresponding to the second sub-pixel 6 is non-integer times of the noise cycle P.

The pixel group 2 includes the pixel column 15, the driving signal line includes the clock signal line, the charging enabling level includes the clock enabling level, and the first order includes the first type of first order.

In the above structure, the clock signal line is configured to control charging of the data line. In the first mode, the phase difference between the clock enabling levels provided by ck_1 corresponding to the first sub-pixel 5 and ck_4 corresponding to the second sub-pixel 6 is controlled to be non-integer times of the noise cycle P, such that positions of the noise signal that correspond to end time points of two clock enabling levels are different. Therefore, at end time points of charging two data lines connected to the first sub-pixel 5 and the second sub-pixel 6, the noise signal has different impacts on finally transmitted data voltages on two data lines. In this way, when the data voltages on two data lines are written into the first sub-pixel 5 and the second sub-pixel 6 to charge the first sub-pixel 5 and the second sub-pixel 6, the brightness difference exists between the first sub-pixel 5 and the second sub-pixel 6. Based on the above analysis, a brightness difference between adjacent same-color sub-pixels is visually compensated for, and therefore is not recognized as a stripe by human eyes.

In some embodiments of the present disclosure, referring to FIG. 15 to FIG. 17, the sub-pixels 1 further includes second color sub-pixels 7 and third color sub-pixels 8.

The pixel columns 15 includes a first pixel column 19, a second pixel column 21, and a third pixel column 20. The first pixel column 19 at least includes the first color sub-pixel 4, and multiple first color sub-pixels 4 in the first pixel column 19 are aligned to each other. The second pixel column 21 at least includes the third color sub-pixel 8, and multiple third color sub-pixels 8 in the second pixel column 21 are aligned to each other. The third pixel column 20 at least includes the second color sub-pixel 7, and multiple second color sub-pixels 7 in the third pixel column 20 are aligned to each other.

The repeating unit 16 includes at least two first pixel columns 19, at least two second pixel columns 21, and at least two third pixel columns 20. A phase difference between clock enabling levels provided by clock signal lines corresponding to two adjacent first pixel columns 19 in the repeating unit 16 is non-integer times of the noise cycle P; and/or a phase difference between clock enabling levels provided by clock signal lines corresponding to two adjacent second pixel columns 21 in the repeating unit 16 is non-integer times of the noise cycle P; and/or, a phase difference between clock enabling levels provided by clock signal lines corresponding to two adjacent ones of third pixel columns 20 in the repeating unit 16 is non-integer times of the noise cycle P.

Based on an arrangement manner of sub-pixels 1 in the first pixel column 19, the second pixel column 21, and the third pixel column 20, taking the first pixel column 19 as an example, when the phase difference between the clock enabling levels provided by the clock signal lines (such as ck_1 and ck_4) corresponding to two adjacent first pixel columns 19 in the repeating unit 16 is non-integer times of the noise cycle P, any two adjacent first color sub-pixels 4 in the first direction x in two adjacent first pixel columns 19 can be considered as the first sub-pixel 5 and the second sub-pixel 6. These first color sub-pixels 4 all have a brightness difference. As a result, for brightness differences of more first color sub-pixels 4 are visually compensated for, and it is more difficult to see a first color stripe by human eyes. The same is true for the second pixel column 21 and the third pixel column 20, and details are not elaborated herein again.

In addition, generally, multiple pixel columns 15 in a same repeating unit 16 correspond to multiple different clock signal lines, but multiple clock signal lines corresponding to different repeating units 16 are the same. For example, referring to FIG. 15, these two repeating units 16 shown in FIG. 15 each correspond to clock signal lines ck_1 to ck_6. When one of the clock signal lines provides the clock enabling level, a data line connected to one pixel column 15 in at least one of multiple repeating units 16 is simultaneously charged.

If the repeating unit 16 only includes one first pixel column 19, one second pixel column 21, and one third pixel column 20, taking the first pixel column 19 as an example, to control clock enabling levels provided by clock signal lines corresponding to two first pixel columns 19 to have a phase difference, at least two repeating units 16 are needed to correspond to two different groups of clock signal lines, such that first pixel columns 19 of these two repeating units 16 are connected to different clock signal lines, so as to stagger clock enabling levels provided by the clock signal lines corresponding to these two first pixel columns 19. Based on this setting, all repeating units 16 still need to correspond to at least six clock signal lines. However, due to a large number of repeating units 16 obtained by dividing the display panel in this manner, there are also a large number of source signal lines.

Compared with the above manner, a division manner of the repeating unit 16 in some embodiments of the present disclosure does not increase a number of clock signal lines, but reduces a number of source signal lines, thereby correspondingly reducing a number of pins to be set.

In some embodiments of the present disclosure, when the pixel columns 15 include the first pixel column 19, the second pixel column 21, and the third pixel column 20, the embodiments of the present disclosure provides description below by using two structures as examples.

First Structure:

In some embodiments of the present disclosure, still referring to FIG. 15, the first pixel column 19 includes only multiple first color sub-pixels 4 arranged along the second direction y, the second pixel column 21 includes only multiple third color sub-pixels 8 arranged along the second direction y, and the third pixel column 20 includes only multiple second color sub-pixels 7 arranged in the second direction y. In addition, the first pixel column 19, the third pixel column 20, and the second pixel column 21 are arranged alternately in sequence.

One first pixel column 19, one third pixel column 20, and one second pixel column 21 that are adjacent to each other form a sub-unit 22. The repeating unit 16 includes at least two sub-units 22.

In the above structure, each pixel column 15 includes only the sub-pixel 1 of one color. To control adjacent sub-pixels 1 with same color in the first direction x to have a brightness difference, it is only required to control a timing sequence of a clock signal line corresponding to a type of pixel column 15. Moreover, in the above configuration manner, at least six pixel columns 15 share one source signal line, and a small number of pins need to be set in the display panel.

Figure 18:
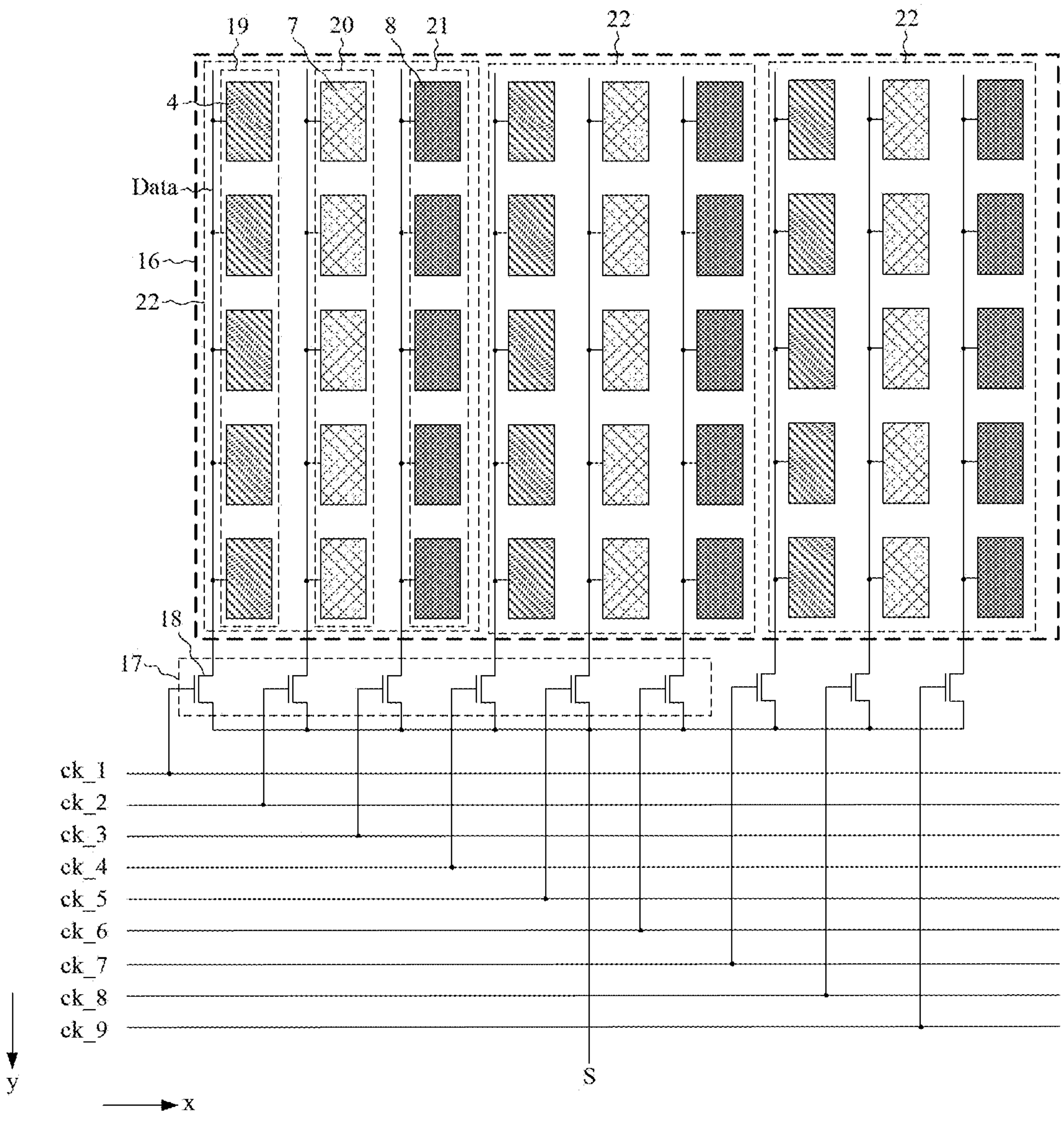
FIG. 18 is a structural schematic diagram of a display panel according to another embodiment of the present disclosure.
Figure 19:
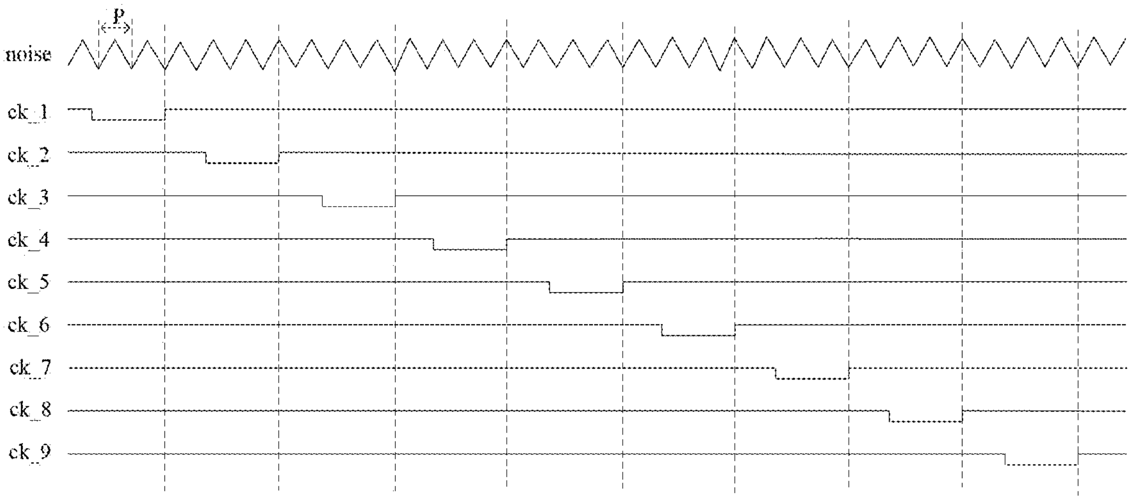
FIG. 19 is a sequence chart of clock signals provided by multiple clock signal lines in FIG. 18 in a first mode according to an embodiment of the present disclosure.

Further, the repeating unit 16 includes an odd number of sub-units 22. For example, as shown in FIG. 18 and FIG. 19, FIG. 18 is a structural schematic diagram of the display panel according to another embodiment of the present disclosure, and FIG. 19 is a sequence chart of clock signals provided by multiple clock signal lines in FIG. 18 in the first mode. The repeating unit 16 includes three sub-units 22. In this case, nine pixel columns 15 share one source signal line, thereby greatly reducing the number of pins to be set in the display panel.

Figure 20:
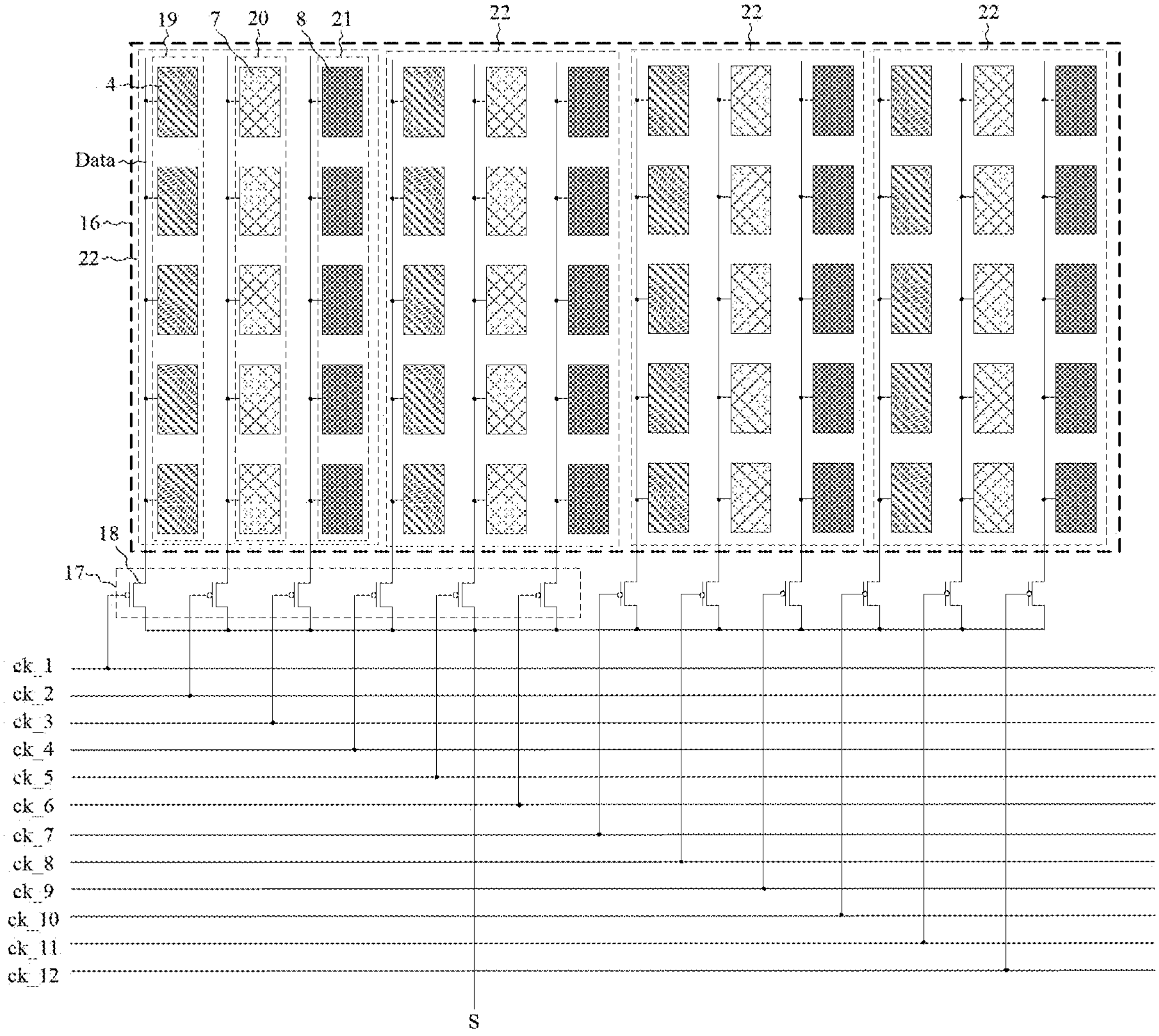
FIG. 20 is a structural schematic diagram of a display panel according to another embodiment of the present disclosure.
Figure 21:
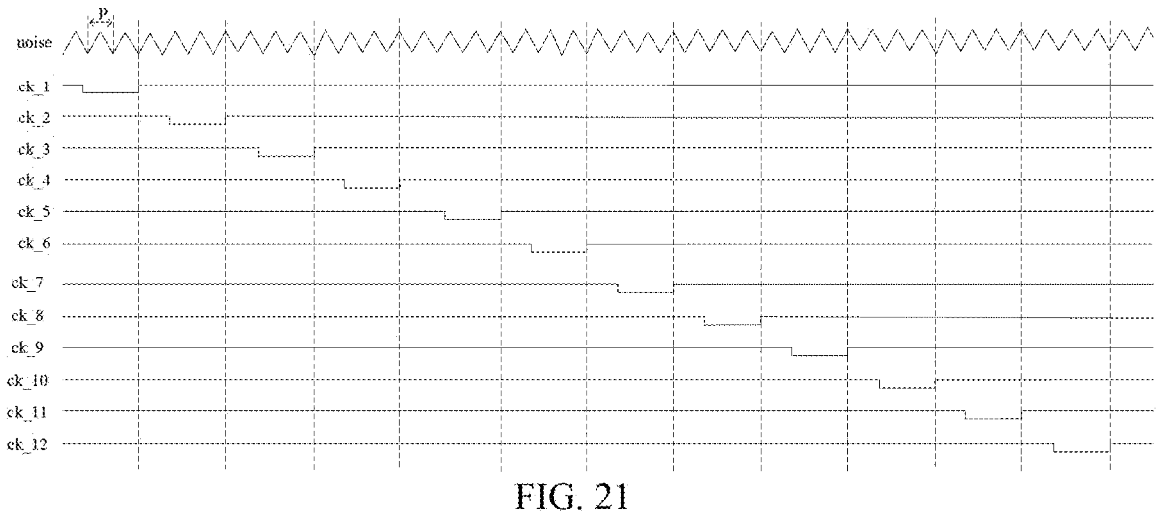
FIG. 21 is a sequence chart of clock signals provided by multiple clock signal lines in FIG. 20 in a first mode according to an embodiment of the present disclosure.

In some embodiments of the present disclosure, the repeating unit 16 can alternatively include an even number of sub-units 22. For example, as shown in FIG. 20 and FIG. 21, FIG. 20 is a structural schematic diagram of the display panel according to another embodiment of the present disclosure, and FIG. 21 is a sequence chart of clock signals provided by multiple clock signal lines in FIG. 20 in the first mode. The repeating unit 16 includes four sub-units 22.

In some embodiments of the present disclosure, still referring to FIG. 15 and FIG. 16, in the first mode:

a phase difference between clock enabling levels provided by clock signal lines corresponding to two first color sub-pixels 4 closest to each other in the first direction x in the repeating unit 16 is ΔT21, in other words, the phase difference between the clock enabling levels provided by the clock signal lines (such as ck_1 and ck_4) corresponding to two adjacent first pixel columns 19 in the repeating unit 16 is ΔT21, and $\Delta T21=(N21+x21)\times P$, where P represents the noise cycle, N21 is an integer greater than or equal to 0, and $0<x21<1$;

a phase difference between clock enabling levels provided by clock signal lines corresponding to two second color sub-pixels 7 closest to each other in the first direction x in the repeating unit 16 is ΔT22, in other words, the phase difference between the clock enabling levels provided by the clock signal lines (such as ck_3 and ck_6) corresponding to two adjacent third pixel columns 20 in the repeating unit 16 is ΔT22, and $\Delta T22=(N22+x22)\times P$, where N22 is an integer greater than or equal to 0, and $0<x22<1$; and a phase difference between clock enabling levels provided by clock signal lines corresponding to two third color sub-pixels 8 closest to each other in the first direction x in the repeating unit 16 is ΔT23, in other words, the phase difference between the clock enabling levels provided by the clock signal lines ck_3 and ck_6 corresponding to two adjacent second pixel columns 21 in the repeating unit 16 is ΔT23, and $\Delta T23=(N23+x23)\times P$, where N23 is an integer greater than or equal to 0, and $0<x23<1$.

In the above formulas, N21=N22=N23.

Figure 22:
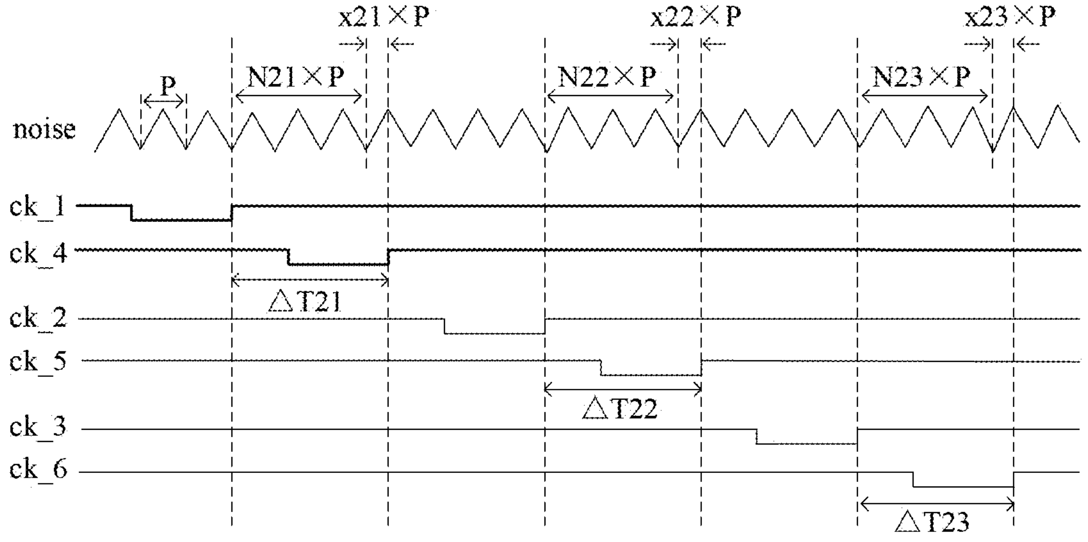
FIG. 22 is a sequence chart of clock signals provided by multiple clock signal lines in FIG. 15 in a first mode according to another embodiment of the present disclosure.

The setting of N21=N22=N23 can provide a more regular sequence for providing clock enabling levels by multiple clock signal lines corresponding to the repeating unit 16. For example, when N21=N22=N23, in a configuration manner, still referring to FIG. 16, when the clock signal lines sequentially provide the clock enabling level in the first type of first order, along an arrangement direction of the pixel columns 15 in the repeating unit 16, clock signal lines corresponding to the pixel columns 15 provide the clock enabling level sequentially. In other words, the clock signal lines ck_1, ck_2, ck_3, ck_4, ck_5, and ck_6 sequentially output the clock enabling level. Alternatively, in another configuration manner, as shown in FIG. 22, FIG. 22 is another sequence chart of the clock signals provided by the clock signal lines in FIG. 15 in the first mode. When the clock signal line sequentially provides the clock enabling level in the first type of first order, at least two clock signal lines corresponding to the first pixel column 19 in the repeating unit 16 provide the clock enabling level sequentially, at least two clock signal lines corresponding to the third pixel column 20 in the repeating unit 16 provide the clock enabling level sequentially, and at least two clock signal lines corresponding to the second pixel column 21 in the repeating unit 16 provide the clock enabling level sequentially. In other words, the clock signal lines ck_1, ck_4, ck_2, ck_5, ck_3, and ck_6 sequentially output the clock enabling level.

In the above configuration manner, in the repeating unit, a uniform bright-dark distribution is achieved between adjacent first pixel columns 19, between adjacent second pixel columns 21, and between adjacent third pixel columns 20*s*, and a brightness difference between adjacent same-color pixel columns 15 is more easily compensated for. Moreover, the above configuration manner is simpler for setting a timing sequence of the clock signal lines, and an order of outputting the clock enabling level by the clock signal lines has certain regularity.

Figure 23:
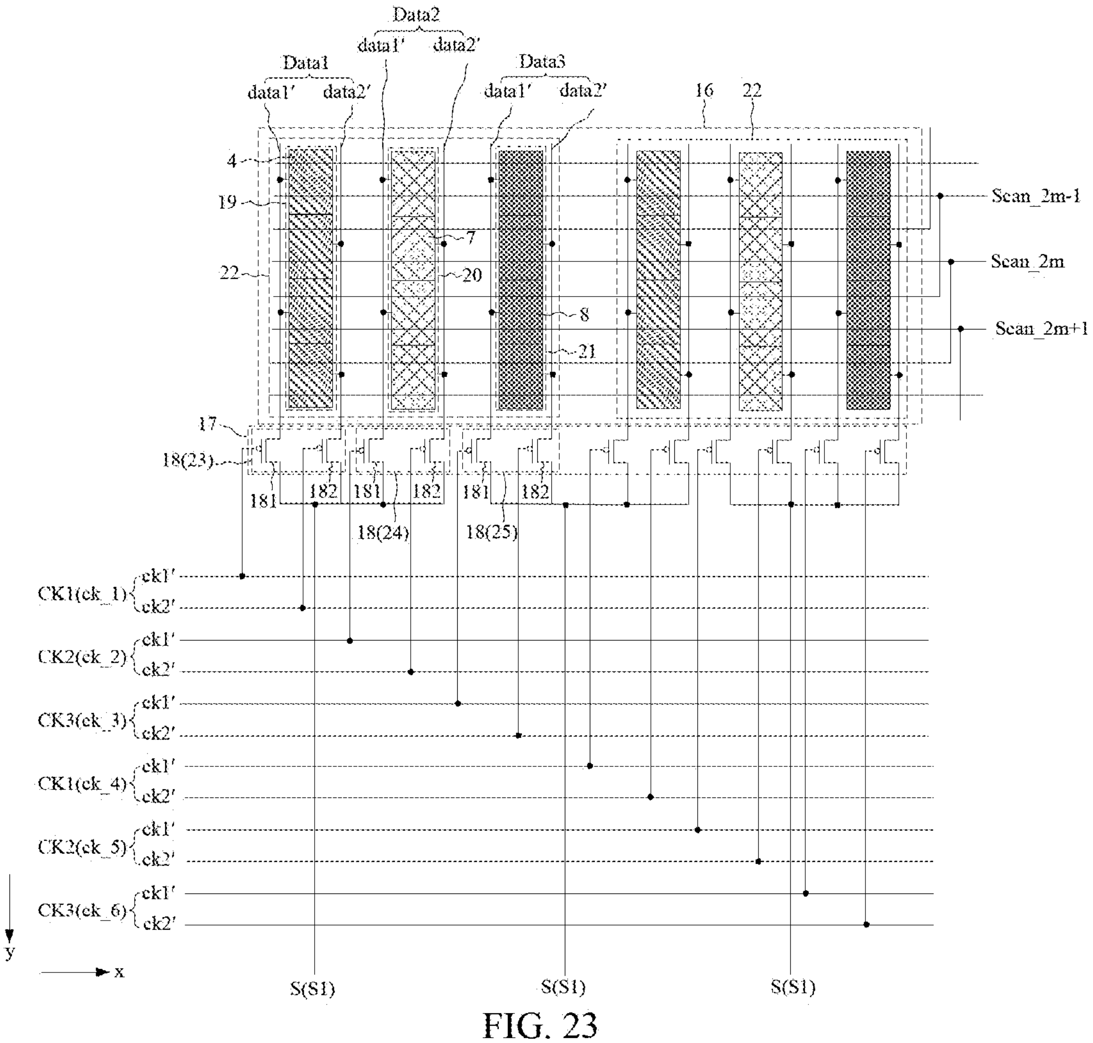
FIG. 23 is a structural schematic diagram of a display panel according to another embodiment of the present disclosure.
Figure 24:
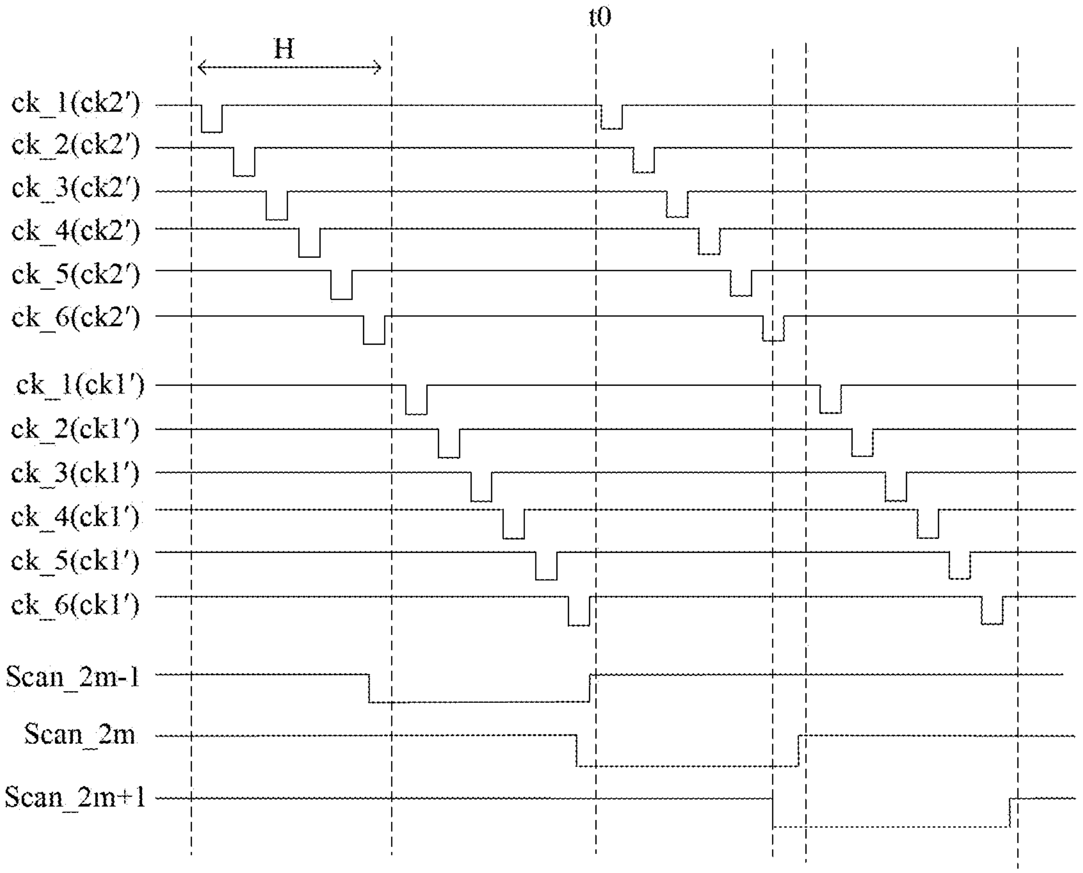
FIG. 24 is a sequence chart of clock signals provided by multiple clock signal lines in FIG. 23 in a first mode according to an embodiment of the present disclosure.

In some embodiments of the present disclosure, as shown in FIG. 23 and FIG. 24, FIG. 23 is a structural schematic diagram of the display panel according to another embodiment of the present disclosure, and FIG. 24 is a sequence chart of clock signals provided by multiple clock signal lines in FIG. 23 in the first mode. The data lines include a first data line Data1 electrically connected to the first pixel column 19, a second data line Data2 electrically connected to the third pixel column 20, and a third data line Data3 electrically connected to the second pixel column 21.

The control switches 18 include a first control switch 23 electrically connected to the first data line Data1, a second control switch 24 electrically connected to the second data line Data2, and a third control switch 25 electrically connected to the third data line Data3. The clock signal lines include a first clock signal line ck1 electrically connected to the first control switch 23, a second clock signal line ck2 electrically connected to the second control switch 24, and a third clock signal line ck3 electrically connected to the third control switch 25.

The first data line Data1, the second data line Data2, and third data line Data3 each include a first data sub-line data1' electrically connected to the sub-pixel 1 in an odd row and a second data sub-line data2' electrically connected to the sub-pixel 1 in an even row. The first control switch 23, the second control switch 24, and the third control switch 25 each include a first sub-switch 181 electrically connected to the first data sub-line and a second sub-switch 182 electrically connected to the second data sub-line Data2'. The first clock signal line ck1, the second clock signal line ck2, and the third clock signal line ck3 each include a first clock sub-line ck1' electrically connected to the first sub-switch 181 and a second clock sub-line ck2' electrically connected to the second sub-switch 182. The first clock sub-line ck1' and the second clock sub-line ck2' in a same clock signal line provide corresponding clock enabling levels at different time points.

In addition, the source signal line includes multiple source signal sub-lines S1. In a configuration manner, the first sub-switch 181 and the second sub-switch 182 that correspond to two pixel columns are connected to a same source signal sub-line 51.

In addition, the display panel further includes a scan signal line (shown by scan). For convenience of understanding, a scan signal line electrically connected to the sub-pixel 1 in an $i^{th}$ row in FIG. 23 is represented by a reference sign Scan_i. In a configuration manner, a scan signal line scan_2 m−1 is electrically connected to a data writing module of a pixel circuit in the sub-pixel 1 in a $(2\ m-1)^{th}$ row and a resetting module of a pixel circuit in the sub-pixel 1 in a $(2\ m+1)^{th}$ row. When the scan signal line scan_2 m−1 provides a low level, the sub-pixel 1 in the $(2\ m-1)^{th}$ row performs a charging operation and the sub-pixel 1 in the $(2\ m+1)^{th}$ row performs a resetting operation. A scan signal line scan_2 m is electrically connected to a data writing module of a pixel circuit in the sub-pixel 1 in a $(2\ m)^{th}$ row and a resetting module of a pixel circuit in the sub-pixel 1 in a $(2\ m+2)^{th}$ row. When the scan signal line scan_2 m provides a low level, the sub-pixel 1 in the $(2\ m)^{th}$ row performs the charging operation and the sub-pixel 1 in the $(2\ m+2)^{th}$ row performs the resetting operation.

Taking the sub-pixel 1 in the $(2\ m+1)^{th}$ row as an example, the scan signal line scan_2 m−1 is enabled, the sub-pixel 1 in the $(2\ m-1)^{th}$ row performs the charging operation, and the sub-pixel 1 in the $(2\ m+1)^{th}$ row performs the resetting operation. Then, the scan signal line scan_2 m is enabled, the sub-pixel 1 in the $(2\ m)^{th}$ row performs the charging operation, and the sub-pixel 1 in the $(2\ m+2)^{th}$ row performs the resetting operation. After the scan signal line scan_2 m is enabled, starting from a time point t0, the first clock sub-lines ck1' in the clock signal lines ck_1 to ck_6 sequentially provide the clock enabling level, and multiple first data sub-lines data1' start to be charged sequentially. When the first clock sub-line ck1' in the clock signal line ck_6 provides the clock enabling level, the scan signal line scan_2 m+1 is enabled, the sub-pixel 1 in the $(2\ m+1)^{th}$ row performs the charging operation by using a data voltage charged on the first data sub-line data1', and the sub-pixel 1 in a $(2\ m+3)^{th}$ row performs the resetting operation.

The above method of setting dual data lines can increase duration of the low level provided by the scan signal line to more than 1H while ensuring normal operation of the display panel, to increase charging duration of the sub-pixel 1 in each row, especially to meet a charging demand of the sub-pixel 1 under high-frequency driving.

Figure 25:
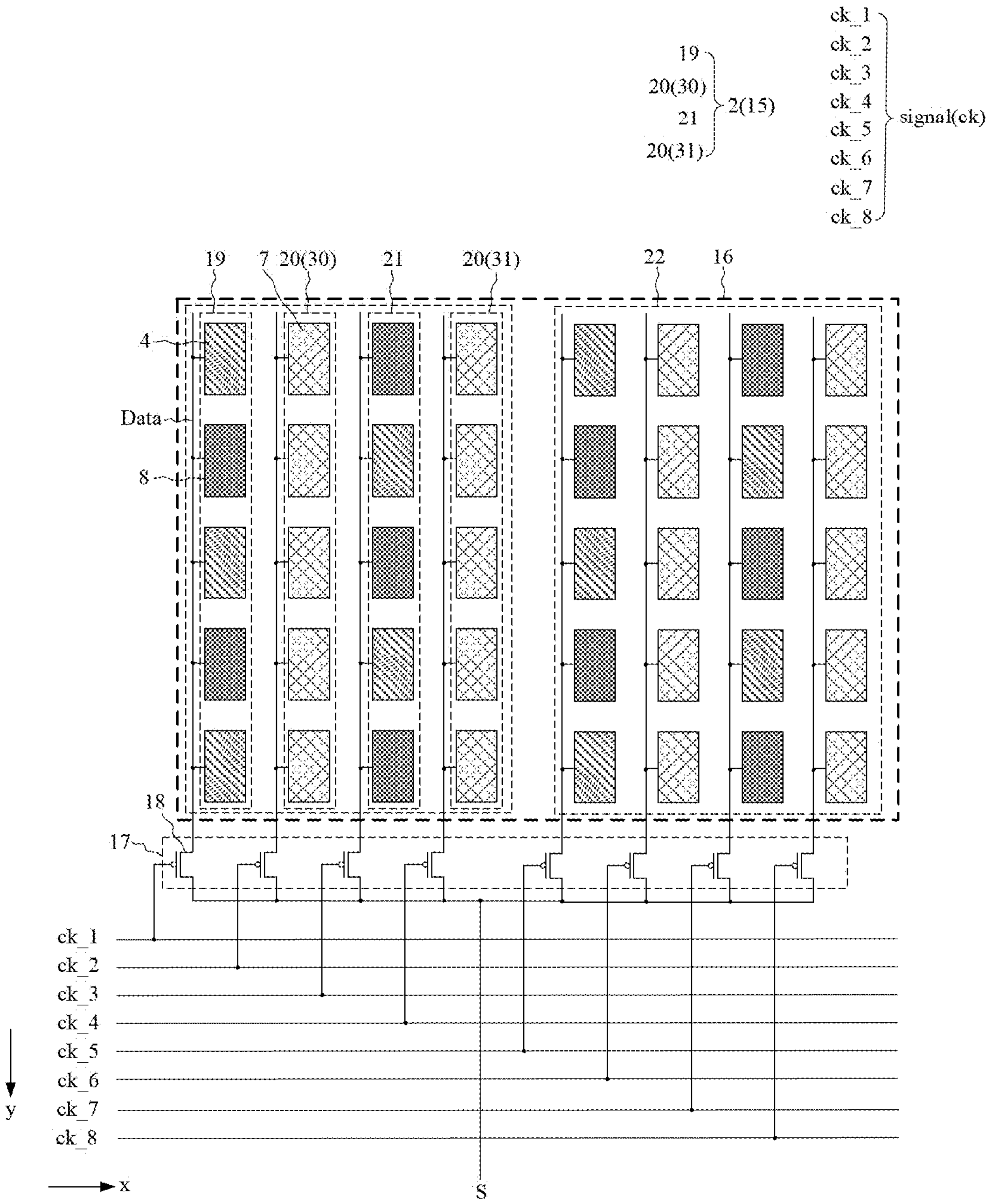
FIG. 25 is a structural schematic diagram of a display panel according to another embodiment of the present disclosure.
Figure 26:
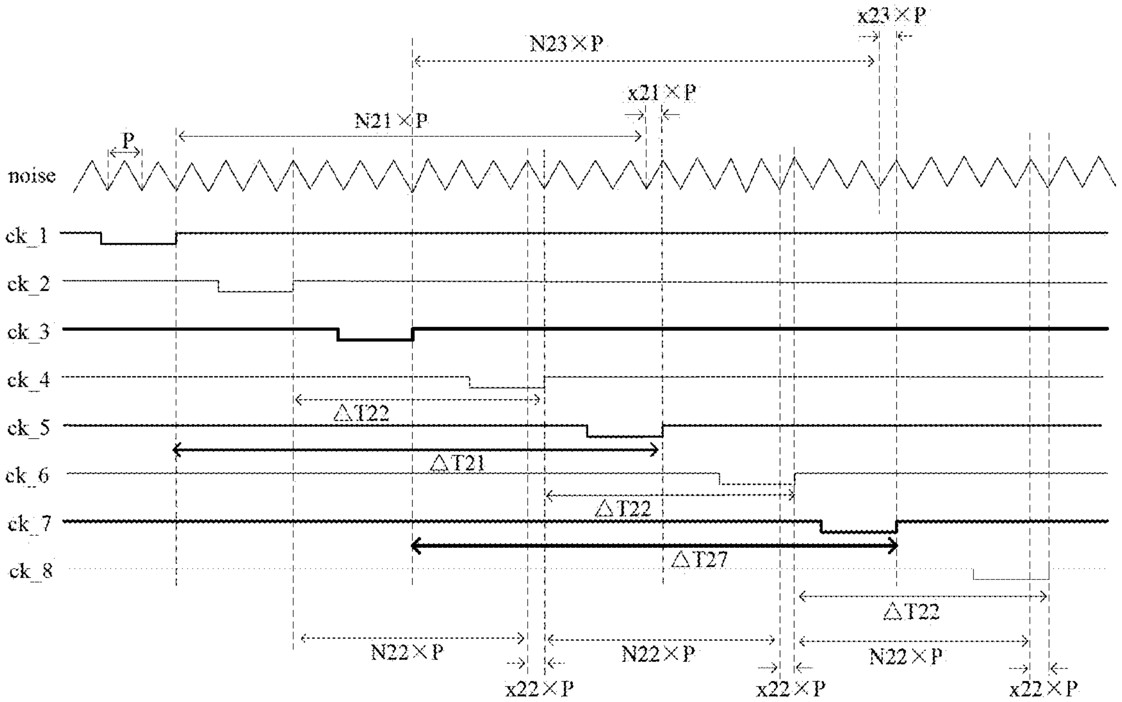
FIG. 26 is a sequence chart of clock signals provided by multiple clock signal lines in FIG. 25 in a first mode.

Second Structure:

In some embodiments of the present disclosure, as shown in FIG. 25 and FIG. 26, FIG. 25 is a structural schematic diagram of the display panel according to another embodiment of the present disclosure, and FIG. 26 is a sequence chart of multiple clock signal lines in FIG. 25. The first pixel column 19 further includes a third color sub-pixel 8, and the first color sub-pixel 4 and the third color sub-pixel 8 in the first pixel column 19 are alternately arranged in the second direction y. The second pixel column 21 further includes the first color sub-pixel 4, and the third color sub-pixel 8 and the first color sub-pixel 4 in the second pixel column 21 are arranged alternately in the second direction y. The third pixel column 20 includes only multiple second color sub-pixels 7 arranged along the second direction y. Moreover, the first color sub-pixel 4 in the first pixel column 19 corresponds to the third color sub-pixel 8 in the second pixel column 21.

The third pixel column 20 includes a first type of third pixel column 30 and a second type of third pixel column 31. The first pixel column 19, the first type of third pixel column 30, the second pixel column 21, and the second type of third pixel column 31 are arranged alternately in sequence.

One first pixel column 19, one first type of third pixel column 30, one second pixel column 21, and one second type of third pixel column 31 that are adjacent to each other form a sub-unit 22. The repeating unit 16 includes at least two sub-units 22.

Based on the above structure, two adjacent first color sub-pixels 4, two adjacent second color sub-pixels 7, and two adjacent third color sub-pixels 8 in the first direction x are spaced by different quantities of sub-pixels 1. The two adjacent first color sub-pixels 4 in the first direction x are spaced by three sub-pixels 1 (two second color sub-pixels 7 and one third color sub-pixel 8), two adjacent second color sub-pixels 7 in the first direction x are spaced by one sub-pixel 1 (one first color sub-pixel 4 or one third color sub-pixel 8), and two adjacent third color sub-pixels 8 in the first direction x are spaced by three sub-pixels 1 (two second color sub-pixels 7 and one first color sub-pixel 4).

In a configuration manner, referring to FIG. 26, when the clock signal lines ck_1 to ck_8 sequentially output the clock enabling level, a number of noise cycles P of an integer number contained in a phase difference between clock enabling levels output by clock signal lines (such as ck_1 and ck_5) corresponding to two adjacent first color sub-pixels 4 is equal to a number of noise cycles P of an integer number contained in a phase difference between clock enabling levels output by clock signal lines (such as ck_3 and ck_7) corresponding to two adjacent third color sub-pixels 8, and is greater than a number of noise cycles P of an integer number contained in a phase difference between clock enabling levels output by clock signal lines (such as ck_2 and ck_4, ck_4 and ck_6, or ck_6 and ck_8) corresponding to two adjacent second color sub-pixels 7.

Further, the repeating unit 16 includes an even number of sub-units 22. For example, referring to FIG. 25, the repeating unit 16 includes two sub-units 22.

When the repeating unit 16 includes the even number of sub-units 22, taking the first color sub-pixel 4 in the first pixel column 19 as an example, since the repeating unit 16 includes an even number of first pixel columns 19, there is a brightness difference between first color sub-pixels 4 in each two adjacent first pixel columns 19 in the repeating unit 16, and a brightness difference between first color sub-pixels 4 in two first pixel columns 19 closest to each other in two adjacent repeating units 16. In this case, the brightness difference between the first color sub-pixels 4 is evenly distributed in the display panel, and is not easily visible to human eyes.

In some embodiments of the present disclosure, still referring to FIG. 25 and FIG. 26, in the first mode:

- a phase difference between clock enabling levels provided by clock signal lines corresponding to two first color sub-pixels 4 closest to each other in the first direction x in the repeating unit 16 is ΔT21, and ΔT21=(N21+ x21)×P, where P represents the noise cycle, N21 is an integer greater than or equal to 0, and 0<x21<1;

a phase difference between clock enabling levels provided by clock signal lines corresponding to two second color sub-pixels 7 closest to each other in the first direction x in the repeating unit 16 is ΔT22, and ΔT22=(N22+x22)×P, where N22 is an integer greater than or equal to 0, and 0<x22<1; and a phase difference between clock enabling levels provided by clock signal lines corresponding to two third color sub-pixels 8 closest to each other in the first direction x in the repeating unit 16 is ΔT23, and ΔT23=(N23+x23)×P, where N23 is an integer greater than or equal to 0, and 0<x23<1.

In the above formulas, N22≠N21, and N22≠N23. It should be noted that based on arrangement manners of the first color sub-pixel 4 and the second color sub-pixel 7 in the first pixel column 19 and the second pixel column 21, the ΔT21 and the ΔT23 can be equal.

Based on the above setting, in a configuration manner, still referring to FIG. 26, when the clock signal lines sequentially provide the clock enabling level in the first type of first order, along an arrangement direction of the pixel columns 15 in the repeating unit 16, clock signal lines corresponding to the pixel columns 15 provide the clock enabling level sequentially. In other words, the clock signal lines ck_1, ck_2, ck_3, ck_4, ck_5, ck_6, ck_7, and ck_8 sequentially output the clock enabling level.

In this case, the clock enabling levels provided by the clock signal lines (ck_2 and ck_4, ck_4 and ck_6, or ck_6 and ck_8) corresponding to two adjacent third pixel columns 20 are spaced by a clock enabling level provided by only one other clock signal line, causing a small phase difference ΔT23 between the adjacent second color sub-pixels 7. However, the clock enabling levels provided by the clock signal lines (ck_1 and ck_5) corresponding to two adjacent first pixel columns 19 are spaced by clock enabling levels provided by three other clock signal lines, and the clock enabling levels provided by the clock signal lines (ck_3 and ck_7) corresponding to two adjacent second pixel columns 21 are also spaced by clock enabling levels provided by three other clock signal lines, causing a large phase difference ΔT21 between the adjacent first color sub-pixels 4 and a large phase difference ΔT23 between the adjacent third color sub-pixels 8. Therefore, the N22 is less than the N21 and the N23.

Moreover, in the above timing sequence configuration manner, a timing sequence of the clock signal lines is more regular and a setting of the timing sequence is also simpler.

Figure 27:
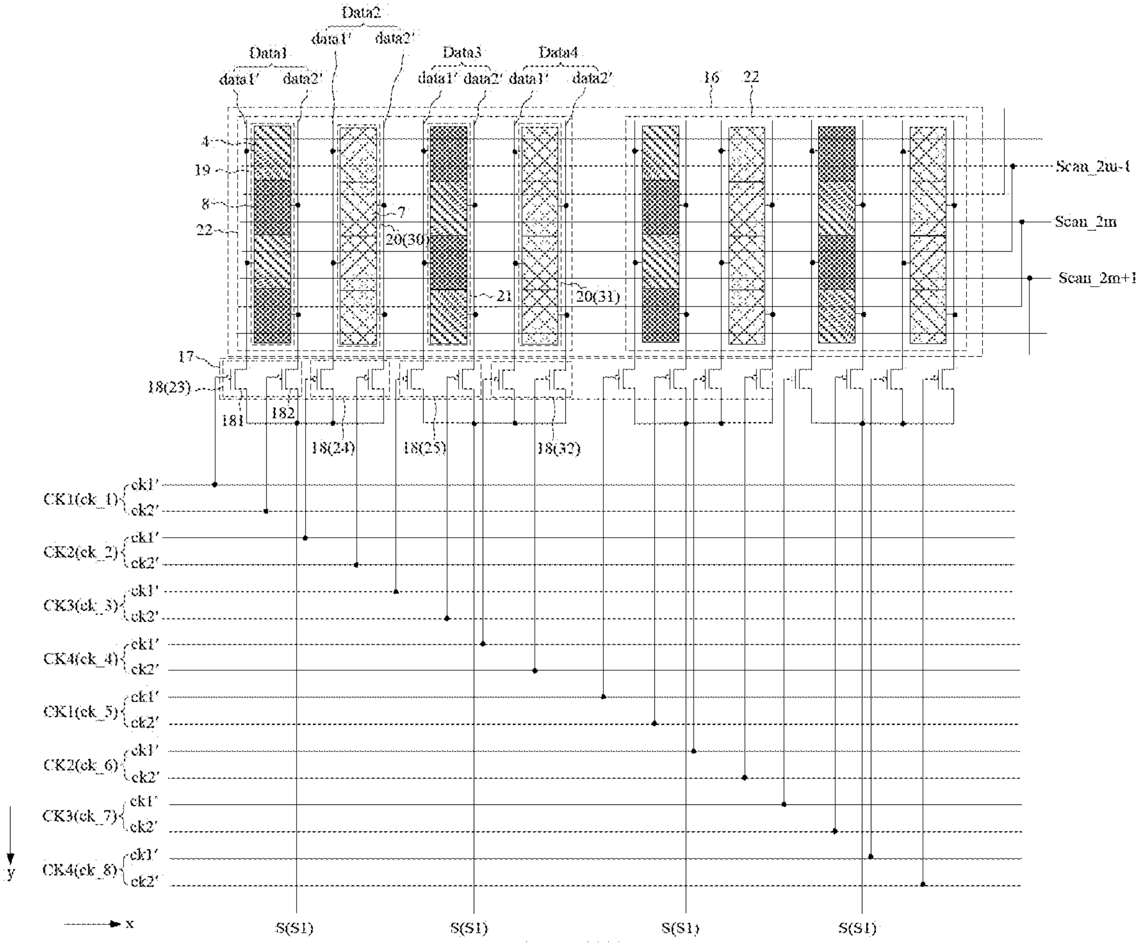
FIG. 27 is a structural schematic diagram of a display panel according to another embodiment of the present disclosure.
Figure 28:
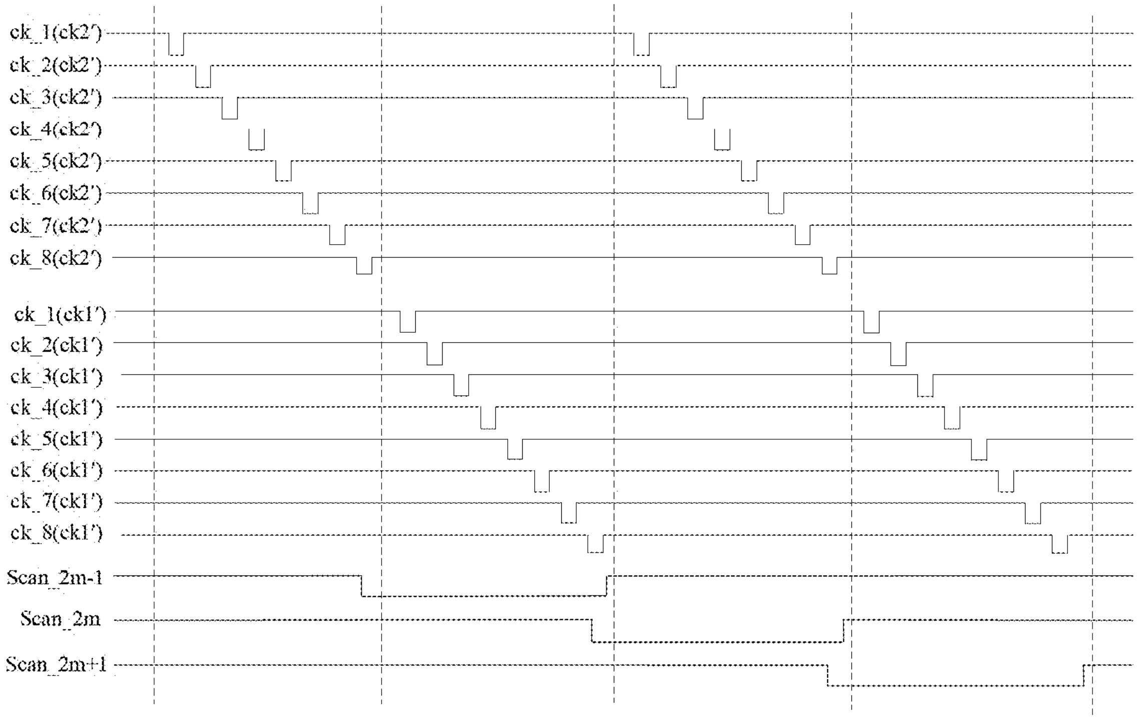
FIG. 28 is a sequence chart of clock signals provided by multiple clock signal lines in FIG. 27 in a first mode according to an embodiment of the present disclosure.

In some embodiments of the present disclosure, as shown in FIG. 27 and FIG. 28, FIG. 27 is a structural schematic diagram of the display panel according to another embodiment of the present disclosure, and FIG. 28 is a sequence chart of clock signals provided by multiple clock signal lines in FIG. 27 in the first mode. The data lines include a first data line Data1 electrically connected to the first pixel column 19, a second data line Data2 electrically connected to the first type of third pixel column 30, a third data line Data3 electrically connected to the second pixel column 21, and a fourth data line Data4 electrically connected to the second type of third pixel column 31.

The control switches 18 include a first control switch 23 electrically connected to the first data line Data1, a second control switch 24 electrically connected to the second data line Data2, a third control switch 25 electrically connected to the third data line Data3, and a fourth control switch 32 electrically connected to the fourth data line Data4. The clock signal lines include a first clock signal line ck1 electrically connected to the first control switch 23, a second clock signal line ck2 electrically connected to the second control switch 24, a third clock signal line ck3 electrically connected to the third control switch 25, and a fourth clock signal line ck4 electrically connected to the fourth control switch 32.

The first data line Data1, the second data line Data2, the third data line Data3, and the fourth data line Data4 each include a first data sub-line electrically connected to the sub-pixel 1 in an odd row and a second data sub-line Data2' electrically connected to the sub-pixel 1 in an even row. The first control switch 23, the second control switch 24, the third control switch 25, and the fourth control switch 32 each include a first sub-switch 181 electrically connected to the first data sub-line and a second sub-switch 182 electrically connected to the second data sub-line Data2'. The first clock signal line ck1, the second clock signal line ck2, the third clock signal line ck3, and the fourth clock signal line ck4 each include a first clock sub-line ck1' electrically connected to the first sub-switch 181 and a second clock sub-line ck2' electrically connected to the second sub-switch 182. The first clock sub-line ck1' and the second clock sub-line ck2' in a same clock signal line provide corresponding clock enabling levels at different time points.

In addition, the source signal line includes multiple source signal sub-lines S1. In a configuration manner, the first sub-switch 181 and the second sub-switch 182 that correspond to two pixel columns are connected to a same source signal sub-line S1.

In addition, the display panel further includes a scan signal line. A connection mode and a working principle of the scan signal line can be the same as the connection mode and the working principle described in the first structure, and details are not elaborated herein again. The above method of setting dual data lines can increase charging duration of the sub-pixel 1 in each row while ensuring normal operation of the display panel, thereby improving a charging effect.

Figure 29:
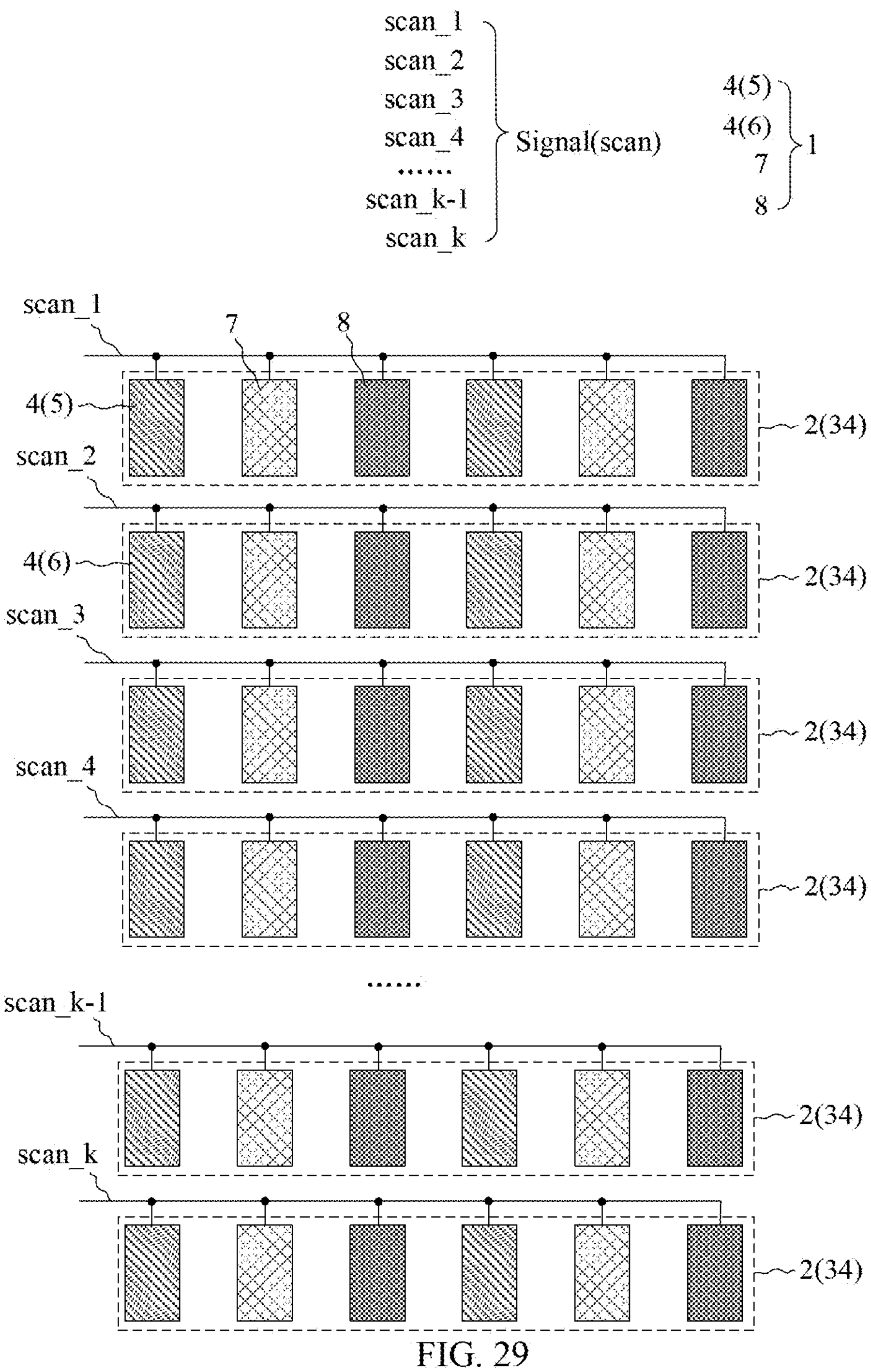
FIG. 29 is a structural schematic diagram of a display panel according to another embodiment of the present disclosure.
Figure 30:
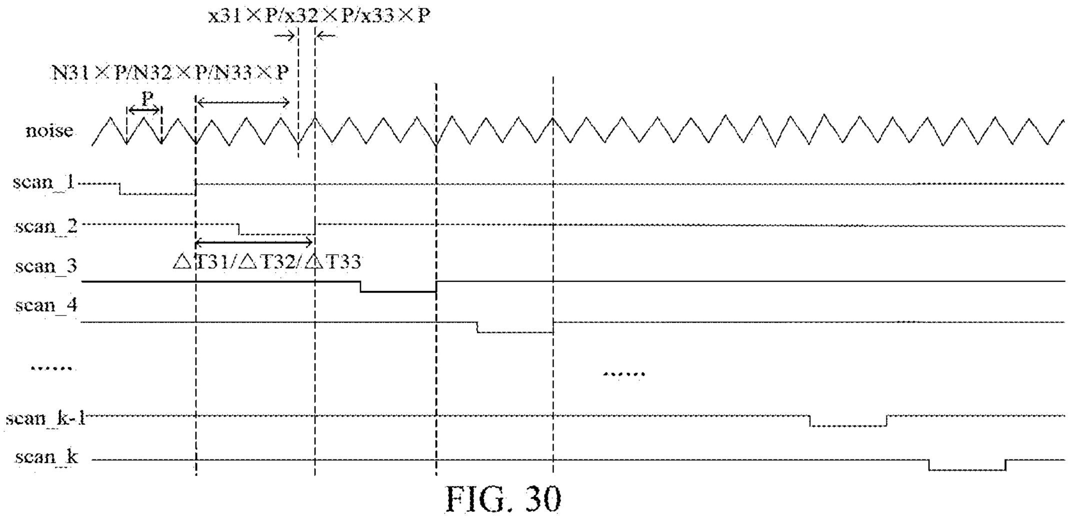
FIG. 30 is a sequence chart of scan signals provided by multiple scan signal lines in FIG. 29 in a first mode according to an embodiment of the present disclosure.
Figure 31:
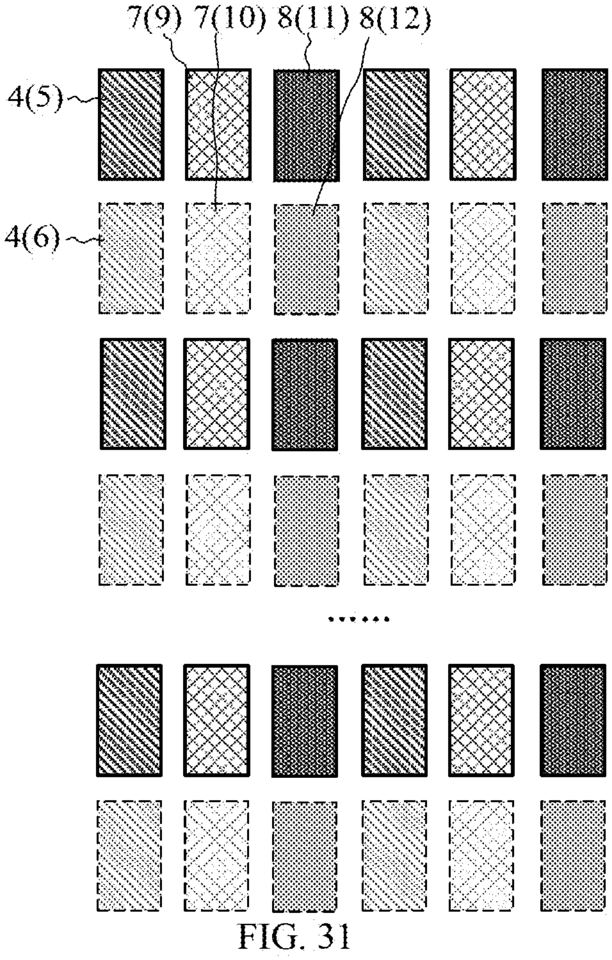
FIG. 31 is a schematic diagram of brightness of a sub-pixel in FIG. 30 according to an embodiment of the present disclosure.

In some embodiments of the present disclosure, as shown in FIG. 29 to FIG. 31, FIG. 29 is a structural schematic diagram of the display panel according to another embodiment of the present disclosure, FIG. 30 is a sequence chart of scan signals provided by multiple scan signal lines in FIG. 29 in the first mode, and FIG. 31 is a schematic brightness diagram of the sub-pixel in FIG. 30. The display panel includes multiple pixel rows 34 arranged along the second direction y. The pixel row 34 includes multiple sub-pixels 1 arranged along the first direction x. The first direction x intersects the second direction y.

The display panel further includes multiple scan signal lines, and the scan signal line is electrically connected to the sub-pixel 1 in at least one of the pixel rows 34. For convenience of understanding, in FIG. 29, the scan signal lines are represented by reference signs scan_1 to scan_k respectively.

The scan signal lines sequentially provide a scan enabling level in a second type of first order. The second type of first order can be an arrangement order of the pixel rows 34. When the scan signal line provides the scan enabling level, the data voltage on the data line is transmitted to the sub-pixel 1 in a pixel row 34 connected thereto and written into the sub-pixel 1 to charge the sub-pixel 1. The first sub-pixel 5 and the second sub-pixel 6 are located in different pixel rows 34 and correspond to different scan signal lines. In the first mode, a phase difference between scan enabling levels provided by the scan signal lines corresponding to the first sub-pixel 5 and the second sub-pixel 6 is non-integer times of the noise cycle P.

The pixel group 2 includes the pixel row 34, the driving signal line includes the scan signal line, the charging enabling level includes the scan enabling level, and the first order includes the second type of first order.

When the scan signal line provides the scan enabling level, the data voltage transmitted on the data line charges the sub-pixel 1 enabled by the scan signal line. During the charging, if the display panel receives the noise signal, the noise signal affects the data voltage written into the sub-pixel 1, causing the data voltage to fluctuate. This affects a charging level of the sub-pixel 1, thereby affecting the actual brightness of the sub-pixel 1.

However, in some embodiments of the present disclosure, in the first mode, when the phase difference between the scan enabling levels provided by the scan signal lines corresponding to the first sub-pixel 5 and the second sub-pixel 6 is controlled to be non-integer times of the noise cycle P, positions of the noise signal that correspond to end time points of two scan enabling levels are different, which can prevent the end time points of two scan enabling levels from corresponding to the top (or bottom) point of the noise signal simultaneously. This further avoids the maximum positive fluctuations (or maximum negative fluctuations) of the data voltages corresponding to these two adjacent same-color sub-pixels, thereby preventing two adjacent same-color sub-pixels from being maximally bright (or maximally dark) simultaneously. In this way, when the display panel displays the first solid-color image or multi-color image, the brightness deviations of the adjacent first color sub-pixels 4 are not recognized as the obvious stripes by human eyes, which can effectively reduce the impact of the brightness deviation of the first color sub-pixel 4 due to the noise signal on the image observed by human eyes.

In some embodiments of the present disclosure, still referring to FIG. 29 and FIG. 30, the sub-pixel 1 further includes a second color sub-pixel 7 and a third color sub-pixel 8. The pixel row 34 includes the first color sub-pixel 4, the second color sub-pixel 7, and the third color sub-pixel 8 that are alternately arranged in sequence. First color sub-pixels 4 in the pixel rows 34 are aligned to each other, second color sub-pixels 7 in the pixel rows 34 are aligned to each other, and third color sub-pixels 8 in the pixel rows 34 are aligned to each other.

In the first mode:

- a phase difference between scan enabling levels provided by scan signal lines corresponding to two adjacent first color sub-pixels 4 in the second direction y is $\Delta T31$, and $\Delta T31=(N31+x31)\times P$, where the P represents the noise cycle, N31 is an integer greater than or equal to 0, and $0<x31<1$;
- a phase difference between scan enabling levels provided by scan signal lines corresponding to two adjacent second color sub-pixels 7 in the second direction y is $\Delta T32$, and $\Delta T32=(N32+x32)\times P$, where the N32 is an integer greater than or equal to 0, and $0<x32<1$; and
- a phase difference between scan enabling levels provided by scan signal lines corresponding to two adjacent third color sub-pixels 8 in the second direction y is $\Delta T33$, and $\Delta T33=(N33+x33)\times P$, where the N33 is an integer greater than or equal to 0, and $0<x33<1$.

In the above formulas, $N31=N32=N33$.

Based on the above arrangement manner of the sub-pixel 1 in at least one of the pixel rows 34, in the second direction y, two first color sub-pixels 4 closest to each other are located in two adjacent pixel rows 34, two second color sub-pixels 7 closest to each other are located in two adjacent pixel rows 34, and two third color sub-pixels 8 closest to each other are located in two adjacent pixel rows 34. When the scan signal lines sequentially provide the scan enabling level to drive the pixel rows 34, a spacing between scan enabling levels provided by scan signal lines corresponding to any two adjacent pixel rows 34 can be the same. Therefore, the N31, the N32, and the N33 are equal.

Figure 32:
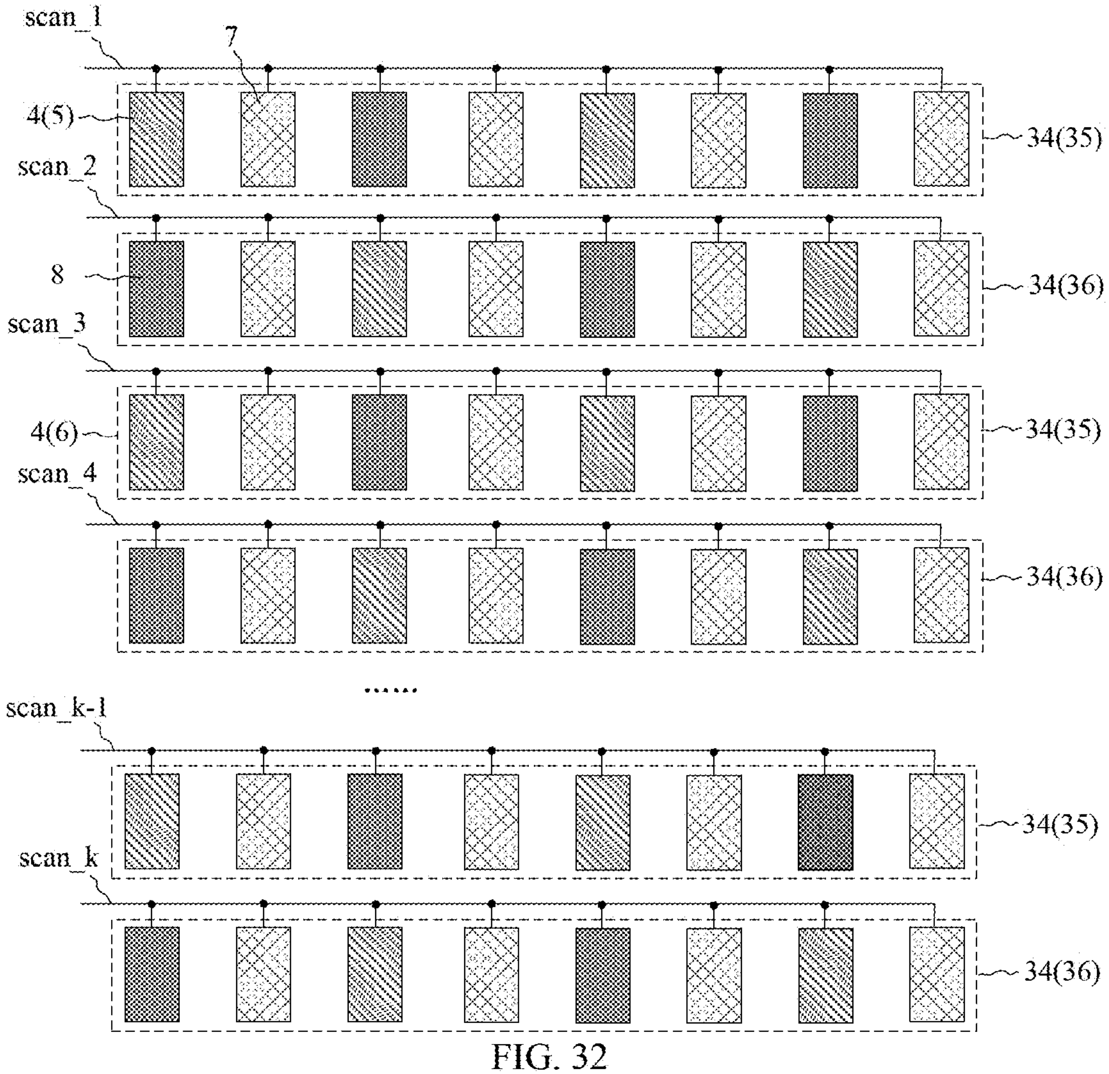
FIG. 32 is a structural schematic diagram of a display panel according to another embodiment of the present disclosure.
Figure 33:
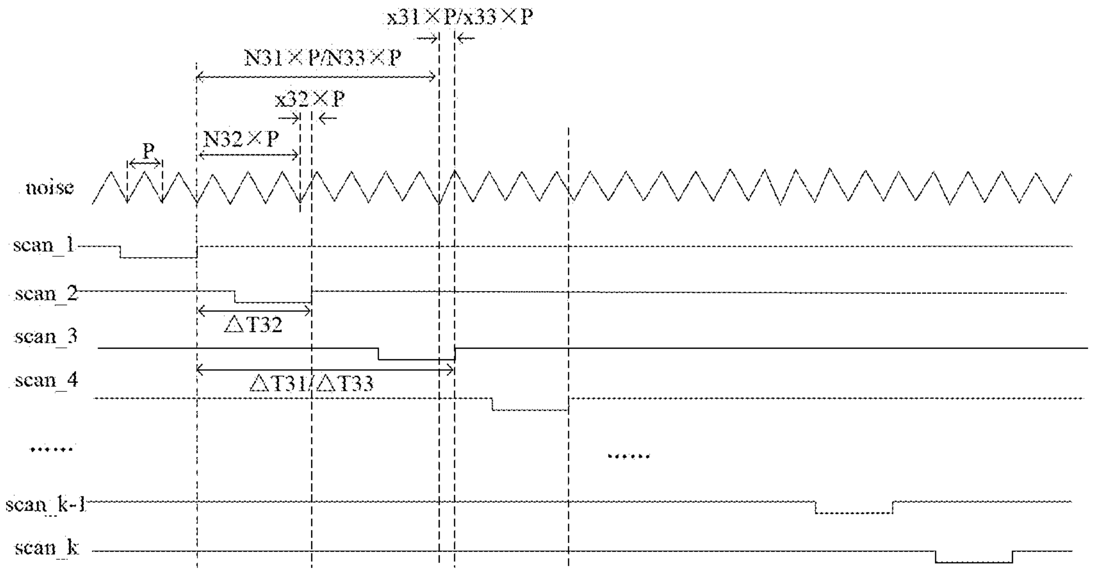
FIG. 33 is a sequence chart of scan signals provided by multiple scan signal lines in FIG. 32 in a first mode according to an embodiment of the present disclosure.
Figure 34:
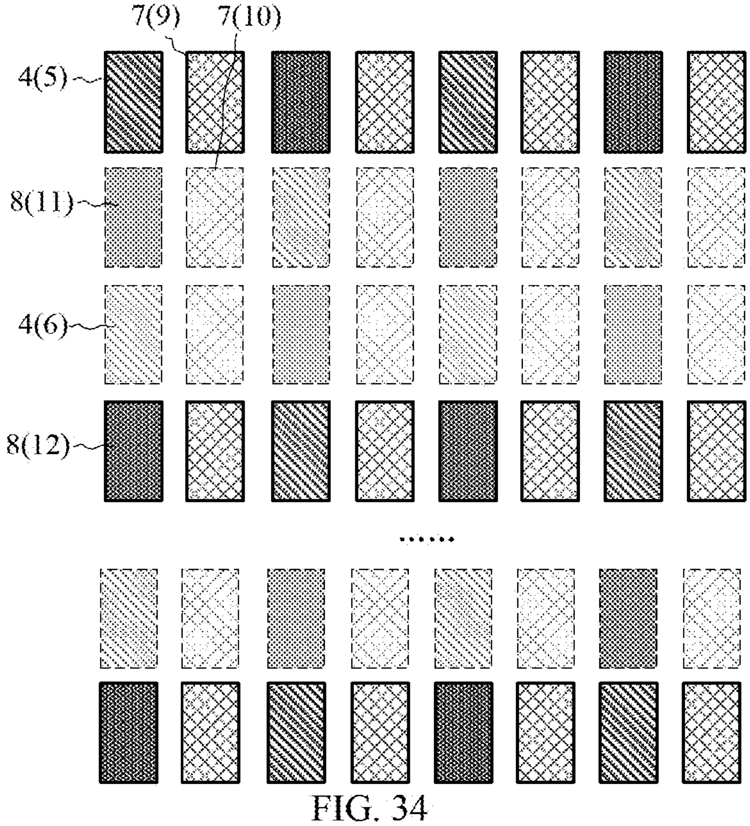
FIG. 34 is a schematic diagram of brightness of a sub-pixel in FIG. 33 according to an embodiment of the present disclosure.

In some embodiments of the present disclosure, as shown in FIG. 32 to FIG. 34, FIG. 32 is a structural schematic diagram of the display panel according to another embodiment of the present disclosure, FIG. 33 is a sequence chart of scan signals provided by multiple scan signal lines in FIG. 32 in the first mode, and FIG. 34 is a schematic brightness diagram of the sub-pixel in FIG. 33. The sub-pixel 1 further includes a second color sub-pixel 7 and a third color sub-pixel 8.

The pixel row 34 includes the first color sub-pixel 4, the second color sub-pixel 7, and the third color sub-pixel 8 that are alternately arranged in sequence. The pixel rows 34 include a first pixel row 35 and a second pixel row 36 that are alternately arranged. The first color sub-pixel 4 in the first pixel row 35 corresponds to the third color sub-pixel 8 in the second pixel row 36. The second color sub-pixel 7 in the first pixel row 35 corresponds to the second color sub-pixel 7 in the second pixel row 36. The third color sub-pixel 8 in the first pixel row 35 corresponds to the first color sub-pixel 4 in the second pixel row 36.

In the first mode:

- a phase difference between scan enabling levels provided by scan signal lines corresponding to two first color sub-pixels 4 closest to each other in the second direction y is $\Delta T31$, and $\Delta T31=(N31+x31)\times P$, where the P represents the noise cycle, the N31 is an integer greater than or equal to 0, and $0<x31<1$;
- a phase difference between scan enabling levels provided by scan signal lines corresponding to two second color sub-pixels 7 closest to each other in the second direction y is $\Delta T32$, and $\Delta T32=(N32+x32)\times P$, where the N32 is an integer greater than or equal to 0, and $0<x32<1$; and
- a phase difference between scan enabling levels provided by scan signal lines corresponding to two third color sub-pixels 8 closest to each other in the second direction Y is $\Delta T33$, and $\Delta T33=(N33+x33)\times P$, where the N33 is an integer greater than or equal to 0, and $0<x33<1$.

In the above formulas, $N32\neq N31$, and $N32\neq N33$. It should be noted that N32s corresponding to two adjacent different second color sub-pixels 7 in the second direction y can be the same or different.

Based on the above arrangement manner of the sub-pixel 1 in at least one of the pixel rows 34, two adjacent first color sub-pixels 4 in the second direction y are located in two adjacent first pixel rows 35 or two adjacent second pixel rows 36 respectively. Similarly, two adjacent third color sub-pixels 8 in the second direction y are located in two adjacent first pixel rows 35 or two adjacent second pixel rows 36 respectively. However, two adjacent second color sub-pixels 7 in the second direction y are respectively located in the first pixel row 35 and the second pixel row 36 that are adjacent to each other.

When the scan signal lines sequentially provide the scan enabling levels to drive the pixel rows 34, scan enabling levels provided by scan signal lines corresponding to any two adjacent first pixel rows 35 are spaced by a scan enabling level provided by a scan signal line corresponding to one second pixel row 36, scan enabling levels provided by scan signal lines corresponding to any two adjacent first pixel rows 35 are spaced by a scan enabling level provided by a scan signal line corresponding to one second pixel row 36, and scan enabling levels provided by scan signal lines corresponding to any first pixel row 35 and second pixel row 36 that are adjacent to each other are not spaced by any other scan enabling level. Therefore, the N31, the N32, and the N33 are different, and the N32 is less than the N31 and the N33.

Figure 35:
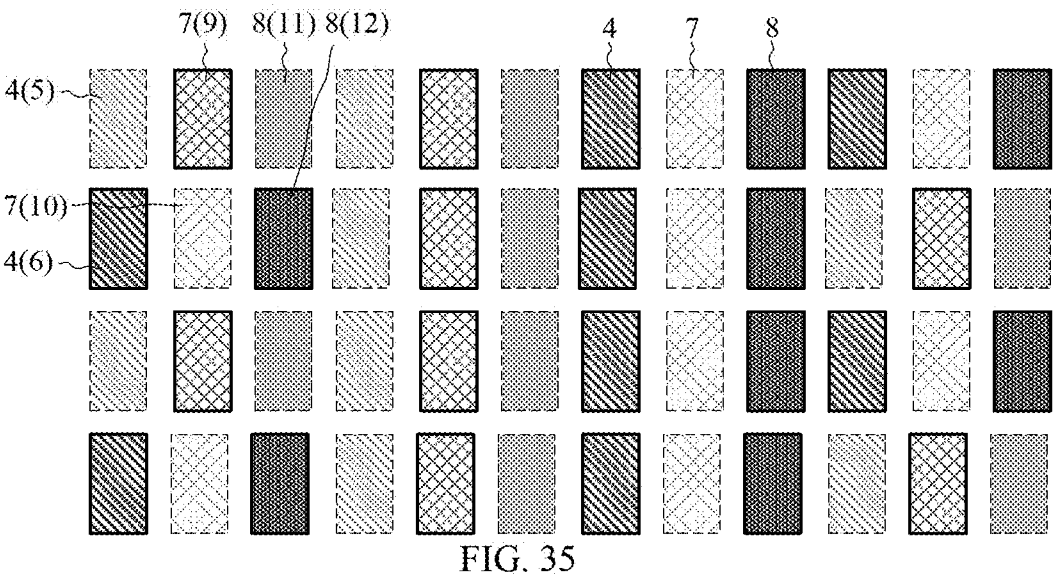
FIG. 35 is a schematic diagram of brightness of a sub-pixel according to another embodiment of the present disclosure.

It should be noted that in some embodiments of the present disclosure, the driving signal line can include one of the clock signal line and the scan signal line, or can include both the clock signal line and the scan signal line. When the driving signal line includes both the clock signal line and the scan signal line, it is possible to simultaneously regulate the charging of the data line and the sub-pixel 1 by the noise signal, to jointly affect the brightness of the sub-pixel 1 based on a charging level of the data line and the charging level of the sub-pixel 1. In this case, brightness of the sub-pixels in the display panel can be shown in FIG. 35.

Based on a same inventive concept, an embodiment of the present disclosure provides a method for driving a display panel. Referring to FIG. 1 and FIG. 2, the display panel includes a sub-pixel 1, multiple pixel groups 2, and multiple driving signal lines. The pixel group 2 includes multiple sub-pixels 1, and an arrangement direction of the pixel group 2 intersects an arrangement direction of the sub-pixel 1 in the pixel group 2. One of the driving signal lines corresponds to the sub-pixel 1 in at least one of the pixel groups 2. The driving signal lines sequentially output a charging enabling level in a first order to drive the corresponding pixel groups 2.

The sub-pixel 1 includes a first color sub-pixel 4, the first color sub-pixel 4 includes a first sub-pixel 5 and a second sub-pixel 6, and the first sub-pixel 5 and the second sub-pixel 6 are located in different pixel groups 2 and correspond to different driving signal lines. In addition, the first sub-pixel 5 and the second sub-pixel 6 are arranged along the arrangement direction of the pixel group 2, and the second sub-pixel 5 and the first sub-pixel 6 are spaced by other first color sub-pixels 4 whose number is less than a preset number.

The display panel has a first mode. The drive method includes: receiving, by the display panel, a noise signal in the first mode. The noise signal has a noise cycle P, and a phase difference between charging enabling levels provided by the driving signal lines corresponding to the first sub-pixel 5 and the second sub-pixel 6 is non-integer times of the noise cycle P.

Based on the above analysis, a controllable distribution of brightness of adjacent first color sub-pixels 4 can be achieved by controlling a phase difference between charging enabling levels provided by driving signal lines corresponding to the adjacent first color sub-pixels 4 to be non-integer times of the noise cycle P, to prevent two adjacent first color sub-pixels 4 from continuously being maximally bright (or maximally dark). In this way, when the display panel displays a first solid-color image or multi-color image, brightness deviations of the adjacent first color sub-pixels 4 are not recognized as obvious stripes by a human eye, which can effectively reduce an impact of the brightness deviation of the first color sub-pixel 4 due to the noise signal on the image observed by human eyes.

In some embodiments of the present disclosure, referring to FIG. 1 and FIG. 2, $\Delta T=(N+x)\times P$. In the above formula, ΔT represents the phase difference between the charging enabling levels provided by the driving signal lines corresponding to the first sub-pixel 5 and the second sub-pixel 6 in the first mode, P represents the noise cycle, N is an integer greater than or equal to 0, and $0.4\leq x\leq 0.6$.

In the first mode, when the ΔT and the P meet the above relationship, after noise cycles P of an integer number are removed, the phase difference between two charging enabling levels is still about half a noise cycle P, resulting in a significant difference between positions of the noise signal that correspond to end time points of two charging enabling levels. For example, if the end time point of one charging enabling level corresponds to the upward trend tr of the noise signal, the end time point of the other charging enabling level corresponds to the downward trend td of the noise signal. In this case, impacts of the noise signal on brightness of the first sub-pixel 5 and the second sub-pixel 6 are opposite, causing one of two first color sub-pixels 4 to be bright and the other to be dark. In this way, the first sub-pixel 5 and the second sub-pixel 6 can be controlled to follow a bright-dark distribution, and a brightness difference between these two sub-pixels is compensated visually, such that equivalent brightness of two sub-pixels tends towards target brightness and thus cannot be recognized as ripples by human eyes to a greater extent.

Further, x can be set to 0.5.

In this case, after the noise cycles P of the integer number are removed, the phase difference between two charging enabling levels is still about half a noise cycle P. Therefore, when the end time points of two charging enabling levels correspond to the upward trend tr and the downward trend td of the noise signal respectively, there will also be a case in which the end time point of one charging enabling level corresponds to a top point of the noise signal and the end time point of the other charging enabling level corresponds to a bottom point of the noise signal. In this case, the brightness difference between the first sub-pixel 5 and the second sub-pixel 6 is visually greater. The brightness difference is easier to be compensated for and less easily recognized by human eyes.

In some embodiments of the present disclosure, referring to FIG. 10 to FIG. 12, the sub-pixel 1 further includes a second color sub-pixel 7 and a third color sub-pixel 8. The display panel include multiple pixels 13. The pixels 13 include the first color sub-pixel 4, the second color sub-pixel 7, and the third color sub-pixel 8. The pixels include a first pixel 14. The first color sub-pixel 4, the second color sub-pixel 7, and the third color sub-pixel 8 in the first pixel 14 correspond to different driving signal lines.

Based on this, the drive method further includes: in the first mode, a phase difference between charging enabling levels provided by the driving signal lines corresponding to the first color sub-pixel 4 and the second color sub-pixel 7 in the first pixel 14 is [M−0.1, M+0.1] times of the noise cycle P, where M is a positive integer; and/or a phase difference between charging enabling levels provided by the driving signal lines corresponding to the first color sub-pixel 4 and the third color sub-pixel 8 in the first pixel 14 is [R−0.1, R+0.1] times of the noise cycle P, where R is a positive integer.

Based on the above analysis, in the above method, the noise signal has a same-direction impact on brightness of at least two different color sub-pixels 1 in the first pixel 14, which can effectively improve color cast of the first pixel 14 itself. Especially when the sub-pixels 1 of three colors in the first pixel 14 are all dark or bright simultaneously, a more significant improvement effect is achieved.

Figure 36:
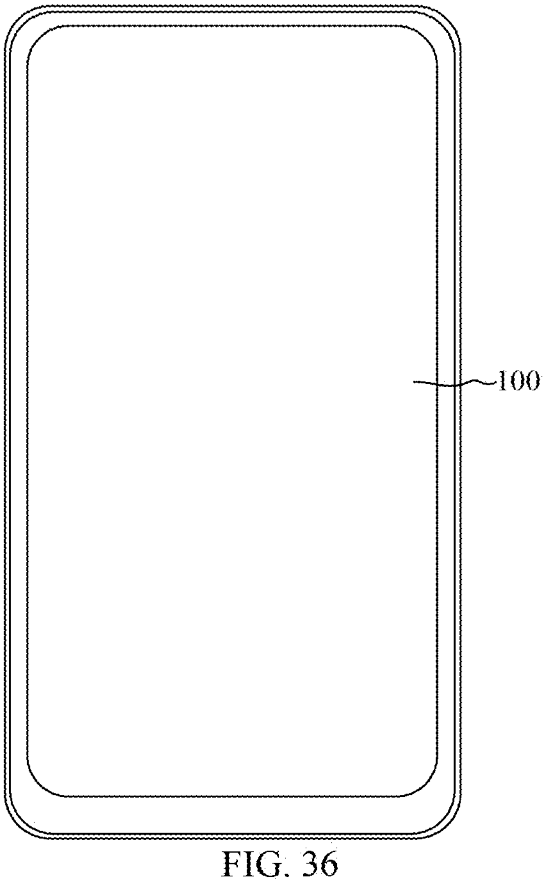
FIG. 36 is a structural schematic diagram of a display apparatus according to an embodiment of the present disclosure.

Based on a same inventive concept, an embodiment of the present disclosure provides a display apparatus. FIG. 36 is a structural schematic diagram of a display apparatus according to an embodiment of the present disclosure. As shown in FIG. 36, the display apparatus includes the above display panel 100. A specific structure of the display panel 100 has been described in detail in the foregoing embodiments. Details are not elaborated herein again. The display apparatus shown in FIG. 36 is for schematic description only. The display apparatus can be any electronic device with a display function, such as a mobile phone, a tablet computer, a notebook computer, an ebook, or a television.

The above are merely preferred embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various obvious modifications, readjustments, and substitutions without departing from the scope of the present disclosure.

What is claimed is:

1. A display panel, comprising:

pixel groups, wherein at least one pixel group of the pixel groups comprises sub-pixels, and wherein an arrangement direction of the pixel groups intersects an arrangement direction of the sub-pixels in the at least one pixel group; and driving signal lines, wherein one driving signal line of the driving signal lines corresponds to the sub-pixels in the at least one pixel group, and wherein the driving signal lines sequentially output charging enabling levels in a first order to drive the corresponding pixel groups, wherein the sub-pixels comprise a first color sub-pixel, the first color sub-pixel comprises a first sub-pixel and a second sub-pixel, wherein the first sub-pixel and the second sub-pixel are located in different pixel groups and correspond to different driving signal lines, the first sub-pixel and the second sub-pixel are arranged along the arrangement direction of the pixel groups, the second sub-pixel and the first sub-pixel are spaced by other first color sub-pixels, and the number of other first color sub-pixels is not greater than a preset number;

wherein the display panel comprises a first mode, and wherein, in the first mode, the display panel receives a noise signal having a noise cycle, and a phase difference between charging enabling levels provided by the driving signal lines corresponding to the first sub-pixel and the second sub-pixel is non-integer times of the noise cycle;

wherein the sub-pixels further comprises a second color sub-pixel and a third color sub-pixel;

wherein the second color sub-pixel comprises a third sub-pixel and a fourth sub-pixel, the third sub-pixel and the fourth sub-pixel are located in different pixel groups and correspond to different driving signal lines, the third sub-pixel and the fourth sub-pixel are arranged along the arrangement direction of the pixel groups, the third sub-pixel and the fourth sub-pixel are spaced apart by other second color sub-pixels, and the number of the other second color sub-pixels is less than the preset number; wherein in the first mode, a phase difference between charging enabling levels provided by the driving signal lines corresponding to the third sub-pixel and the fourth sub-pixel is non-integer times of the noise cycle;

the third color sub-pixel comprises a fifth sub-pixel and a sixth sub-pixel, the fifth sub-pixel and the sixth sub-pixel are located in different pixel groups and correspond to different driving signal lines, the fifth sub-pixel and the sixth sub-pixel are arranged along the arrangement direction of the pixel groups, the fifth sub-pixel and the sixth sub-pixel are spaced by other third color sub-pixels, and the number of the other third color sub-pixels is less than the preset number; and in the first mode, a phase difference between charging enabling levels provided by the driving signal lines corresponding to the fifth sub-pixel and the sixth sub-pixel is non-integer times of the noise cycle;

wherein, in the first mode:

the phase difference between the charging enabling levels provided by the driving signal lines corresponding to the first sub-pixel and the second sub-pixel is $\Delta T11$, and $\Delta T11=(N11+x11)\times P$, where P represents the noise cycle, N11 is an integer greater than or equal to 0, and $0<x11<1$;

the phase difference between the charging enabling levels provided by the driving signal lines corresponding to the third sub-pixel and the fourth sub-pixel is $\Delta T12$, and $\Delta T12=(N12+x12)\times P$, where N12 is an integer greater than or equal to 0, and $0<x12<1$;

the phase difference between the charging enabling levels provided by the driving signal lines corresponding to the fifth sub-pixel and the sixth sub-pixel is $\Delta T13$, and $\Delta T13=(N13+x13)\times P$, where N13 is an integer greater than or equal to 0, and $0<x13<1$, and wherein $x11=x12=x13$, or wherein at least two of x11, x12, and x13 are unequal to each other, and the first color sub-pixel is a red sub-pixel, the second color sub-pixel is a green sub-pixel, and the third color sub-pixel is a blue sub-pixel, and $|x12-0.5|<|x11-0.5|$, and $|x12-0.5|<|x13-0.5|$.

2. The display panel according to claim 1, wherein $\Delta T=(N+x)\times P$, where:

$\Delta T$ represents the phase difference between the charging enabling levels provided by the driving signal lines corresponding to the first sub-pixel and the second sub-pixel in the first mode, P represents the noise cycle, and N is an integer greater than or equal to 0, and $0.4\leq x\leq 0.6$.

3. The display panel according to claim 2, wherein $x=0.5$.

4. The display panel according to claim 1, wherein the preset number is 1, and wherein the second sub-pixel and the first sub-pixel are spaced by, at most, one other first color sub-pixel.

5. The display panel according to claim 1, further comprising pixels, wherein the sub-pixels further comprise a second color sub-pixel and a third color sub-pixel;

at least one pixel of the pixels comprises the first color sub-pixel, the second color sub-pixel, and the third color sub-pixel;

at least one pixel of the pixels comprises a first pixel, wherein the first color sub-pixel, the second color sub-pixel, and the third color sub-pixel in the first pixel are located in different pixel groups and correspond to different driving signal lines; and in the first mode, a phase difference between charging enabling levels provided by the driving signal lines corresponding to the first color sub-pixel and the second color sub-pixel in the first pixel is [M−0.1, M+0.1] times of the noise cycle, where M is a positive integer; or a phase difference between charging enabling levels provided by the driving signal lines corresponding to the first color sub-pixel and the third color sub-pixel in the first pixel is [R−0.1, R+0.1] times of the noise cycle, where R is a positive integer.

6. The display panel according to claim 1, further comprising:

pixel columns arranged along a first direction, wherein at least one pixel column of the pixel columns comprises sub-pixels arranged along a second direction, and wherein the first direction intersects the second direction;

repeating units arranged along the first direction, wherein at least one repeating unit of the repeating unit comprises two or more pixel columns; and switch circuits corresponding to the repeating units, wherein at least one switch circuit of the switch circuits comprises control switches, control terminals of the control switches are respectively electrically connected to clock signal lines, input terminals of the control switches are electrically connected to a source signal line, and output terminals of the control switches are electrically connected to pixel columns in the corresponding repeating unit through data lines, wherein the clock signal lines sequentially provide clock enabling levels in a first type of first order, the first sub-pixel and the second sub-pixel are located in different pixel columns and correspond to different clock signal lines; and in the first mode, a phase difference between clock enabling levels provided by the clock signal lines corresponding to the first sub-pixel and the second sub-pixel is non-integer times of the noise cycle; and at least one pixel group of the pixel groups comprises the at least one pixel column, at least one driving signal line of the driving signal lines comprises the clock signal line, the charging enabling level comprises the clock enabling level, and the first order comprises the first type of first order.

7. The display panel according to claim 6, wherein the sub-pixels further comprise a second color sub-pixel and a third color sub-pixel;

pixel columns comprise a first pixel column, a second pixel column, and a third pixel column, wherein the first pixel column comprises at least the first color sub-pixels, the second pixel column comprises at least the third color sub-pixels, and the third pixel column comprises at least the second color sub-pixels;

the repeating unit comprises at least two first pixel columns, at least two second pixel columns, and at least two third pixel columns; and a phase difference between clock enabling levels provided by clock signal lines corresponding to two adjacent first pixel columns in the repeating unit is non-integer times of the noise cycle; or a phase difference between clock enabling levels provided by clock signal lines corresponding to two adjacent second pixel columns in the repeating unit is non-integer times of the noise cycle; or a phase difference between clock enabling levels provided by clock signal lines corresponding to two adjacent third pixel columns in the repeating unit is non-integer times of the noise cycle.

8. The display panel according to claim 7, wherein the first pixel column consists of first color sub-pixels arranged along the second direction, the second pixel column consists of third color sub-pixels arranged along the second direction, and the third pixel column consists of second color sub-pixels arranged in the second direction;

wherein the first pixel column, the third pixel column, and the second pixel column are arranged alternately in sequence;

wherein one first pixel column, one third pixel column, and one second pixel column that are adjacent to one another form a sub-unit, and at least one repeating unit of the repeating units comprises at least two sub-units;

wherein at least one repeating unit of the repeating units comprises an odd number of sub-units;

and wherein in the first mode:

a phase difference between clock enabling levels provided by clock signal lines corresponding to two first color sub-pixels closest to each other in the first direction in the repeating unit is $\Delta T21$, and $\Delta T21=(N21+x21)\times P$, where P represents the noise cycle, N21 is an integer greater than or equal to 0, and $0<x21<1$;

a phase difference between clock enabling levels provided by clock signal lines corresponding to two second color sub-pixels closest to each other in the first direction in the repeating unit is $\Delta T22$, and $\Delta T22=(N22+x22)\times P$, where N22 is an integer greater than or equal to 0, and $0<x22<1$;

a phase difference between clock enabling levels provided by clock signal lines corresponding to two third color sub-pixels closest to each other in the first direction in the repeating unit is $\Delta T23$, and $\Delta T23=(N23+x23)\times P$, where N23 is an integer greater than or equal to 0, and $0<x23<1$, and wherein $N21=N22=N23$.

9. The display panel according to claim 7, wherein the first pixel column further comprises the third color sub-pixel, and the first color sub-pixel and the third color sub-pixel in the first pixel column are alternately arranged along the second direction;

the second pixel column further comprises the first color sub-pixel, and the third color sub-pixel and the first color sub-pixel in the second pixel column are alternately arranged along the second direction;

the third pixel column consists of second color sub-pixels arranged along the second direction;

and the first color sub-pixel in the first pixel column corresponds to the third color sub-pixel in the second pixel column;

wherein the third pixel column comprises a first type of third pixel column and a second type of third pixel column, and the first pixel column, the first type of third pixel column, the second pixel column, and the second type of third pixel column are arranged alternately in sequence;

one first pixel column, one first type of third pixel column, one second pixel column, and one second type of third pixel column that are adjacent to one another form a sub-unit, and the repeating unit comprises at least two sub-units;

wherein the repeating unit comprises an even number of sub-units;

wherein in the first mode:

a phase difference between clock enabling levels provided by clock signal lines corresponding to two first color sub-pixels closest to each other in the first direction in the repeating unit is ΔT21, and ΔT21=(N21+x21)×P, where P represents the noise cycle, N21 is an integer greater than or equal to 0, and 0<x21<1;

a phase difference between clock enabling levels provided by clock signal lines corresponding to two second color sub-pixels closest to each other in the first direction in the repeating unit is ΔT22, and ΔT22=(N22+x22)×P, where N22 is an integer greater than or equal to 0, and 0<x22<1;

a phase difference between clock enabling levels provided by clock signal lines corresponding to two third color sub-pixels closest to each other in the first direction in the repeating unit is ΔT23, and ΔT23=(N23+x23)×P, where N23 is an integer greater than or equal to 0, and 0<x23<1, and wherein N22≠N21, and N22≠N23.

10. The display panel according to claim 8, wherein:

the data lines comprise a first data line electrically connected to the first pixel column, a second data line electrically connected to the third pixel column, and a third data line electrically connected to the second pixel column;

the control switches comprise a first control switch electrically connected to the first data line, a second control switch electrically connected to the second data line, and a third control switch electrically connected to the third data line;

the clock signal lines comprise a first clock signal line electrically connected to the first control switch, a second clock signal line electrically connected to the second control switch, and a third clock signal line electrically connected to the third control switch;

the first data line, the second data line, and the third data line each comprise a first data sub-line electrically connected to the sub-pixel in an odd row and a second data sub-line electrically connected to the sub-pixel in an even row;

the first control switch, the second control switch, and the third control switch each comprise a first sub-switch electrically connected to the first data sub-line and a second sub-switch electrically connected to the second data sub-line; and the first clock signal line, the second clock signal line, and the third clock signal line each comprise a first clock sub-line electrically connected to the first sub-switch and a second clock sub-line electrically connected to the second sub-switch, and the first clock sub-line and the second clock sub-line of a same clock signal line provide corresponding clock enabling levels at different time points.

11. The display panel according to claim 9, wherein:

the data lines comprise a first data line electrically connected to the first pixel column, a second data line electrically connected to the first type of third pixel column, a third data line electrically connected to the second pixel column, and a fourth data line electrically connected to the second type of third pixel column;

the control switches comprise a first control switch electrically connected to the first data line, a second control switch electrically connected to the second data line, a third control switch electrically connected to the third data line, and a fourth control switch electrically connected to the fourth data line;

the clock signal lines comprise a first clock signal line electrically connected to the first control switch, a second clock signal line electrically connected to the second control switch, a third clock signal line electrically connected to the third control switch, and a fourth clock signal line electrically connected to the fourth control switch;

the first data line, the second data line, the third data line, and the fourth data line each comprise a first data sub-line electrically connected to the sub-pixel in an odd row and a second data sub-line electrically connected to the sub-pixel in an even row;

the first control switch, the second control switch, the third control switch, and the fourth control switch each comprise a first sub-switch electrically connected to the first data sub-line and a second sub-switch electrically connected to the second data sub-line; and the first clock signal line, the second clock signal line, the third clock signal line, and the fourth clock signal line each comprise a first clock sub-line electrically connected to the first sub-switch and a second clock sub-line electrically connected to the second sub-switch, and the first clock sub-line and the second clock sub-line of a same clock signal line provide corresponding clock enabling levels at different time points.

12. The display panel according to claim 1, further comprising:

pixel rows arranged along a second direction, wherein at least one pixel row of the pixel rows comprises sub-pixels arranged along a first direction, and the first direction intersects the second direction; and scan signal lines electrically connected to the sub-pixels in at least one pixel row;

wherein the scan signal lines sequentially provide scan enabling levels in a second type of first order, the first sub-pixel and the second sub-pixel are located in different pixel rows and correspond to different scan signal lines; and in the first mode, a phase difference between scan enabling levels provided by the scan signal lines corresponding to the first sub-pixel and the second sub-pixel is non-integer times of the noise cycle; and the pixel group comprises the pixel row, the driving signal line comprises the scan signal line, the charging enabling level comprises the scan enabling level, and the first order comprises the second type of first order.

13. The display panel according to claim 12, wherein the sub-pixels further comprise a second color sub-pixel and a third color sub-pixel;

the pixel row comprises the first color sub-pixel, the second color sub-pixel, and the third color sub-pixel that are alternately arranged in sequence, and in the first mode:

a phase difference between scan enabling levels provided by scan signal lines corresponding to two adjacent first color sub-pixels in the second direction is ΔT31, and ΔT31=(N31+x31)×P, where P represents the noise cycle, N31 is an integer greater than or equal to 0, and 0<x31<1;

a phase difference between scan enabling levels provided by scan signal lines corresponding to two adjacent second color sub-pixels in the second direction is ΔT32, and ΔT32=(N32+x32)×P, where N32 is an integer greater than or equal to 0, and 0<x32<1;

a phase difference between scan enabling levels provided by scan signal lines corresponding to two adjacent third color sub-pixels in the second direction is ΔT33, and $\Delta T33=(N33+x33)\times P$, where N33 is an integer greater than or equal to 0, and $0<x33<1$, and wherein $N31=N32-N33$.

14. The display panel according to claim 12, wherein the sub-pixels further comprise a second color sub-pixel and a third color sub-pixel;

at least one pixel row of the pixel rows comprises the first color sub-pixel, one second color sub-pixel, the third color sub-pixel and another second color sub-pixel that are alternately arranged in sequence, the pixel rows comprises first pixel rows and second pixel rows that are alternately arranged, the first color sub-pixel in the first pixel row corresponds to the third color sub-pixel in the second pixel row, the second color sub-pixel in the first pixel row corresponds to the second color sub-pixel in the second pixel row, and the third color sub-pixel in the first pixel row corresponds to the first color sub-pixel in the second pixel row; and in the first mode:

a phase difference between scan enabling levels provided by scan signal lines corresponding to two first color sub-pixels closest to each other in the second direction is $\Delta T31$, and $\Delta T31=(N31+x31)\times P$, where P represents the noise cycle, N31 is an integer greater than or equal to 0, and $0<x31<1$;

a phase difference between scan enabling levels provided by scan signal lines corresponding to two second color sub-pixels closest to each other in the second direction is $\Delta T32$, and $\Delta T32=(N32+x32)\times P$, where N32 is an integer greater than or equal to 0, and $0<x32<1$;

a phase difference between scan enabling levels provided by scan signal lines corresponding to two third color sub-pixels closest to each other in the second direction is $\Delta T33$, and $\Delta T33=(N33+x33)\times P$, wherein N33 is an integer greater than or equal to 0, and $0<x33<1$, and wherein $N32\neq N31$, and $N32\neq N33$.

15. A method for driving a display panel, wherein the display panel comprises:

pixel groups, wherein the pixel group comprises sub-pixels, and an arrangement direction of the pixel groups intersects an arrangement direction of the sub-pixels in the pixel groups; and driving signal lines, wherein one driving signal line of the driving signal lines corresponds to the sub-pixels in at least one pixel group, and the driving signal lines sequentially output charging enabling levels in a first order to drive the corresponding pixel groups, wherein at least one sub-pixels of the sub-pixels comprise first color sub-pixels, the first color sub-pixels comprise a first sub-pixel and a second sub-pixel, the first sub-pixel and the second sub-pixel are located in different pixel groups and correspond to different driving signal lines, the first sub-pixel and the second sub-pixel are arranged along the arrangement direction of the pixel group, the second sub-pixel and the first sub-pixel are spaced by other first color sub-pixels, and the number of the other first color sub-pixels is not greater than a preset number;

the display panel has a first mode; wherein the sub-pixels further comprises a second color sub-pixel and a third color sub-pixel;

wherein the second color sub-pixel comprises a third sub-pixel and a fourth sub-pixel, the third sub-pixel and the fourth sub-pixel are located in different pixel groups and correspond to different driving signal lines, the third sub-pixel and the fourth sub-pixel are arranged along the arrangement direction of the pixel groups, the third sub-pixel and the fourth sub-pixel are spaced apart by other second color sub-pixels, and the number of the other second color sub-pixels is less than the preset number: wherein in the first mode, a phase difference between charging enabling levels provided by the driving signal lines corresponding to the third sub-pixel and the fourth sub-pixel is non-integer times of the noise cycle;

the third color sub-pixel comprises a fifth sub-pixel and a sixth sub-pixel, the fifth sub-pixel and the sixth sub-pixel are located in different pixel groups and correspond to different driving signal lines, the fifth sub-pixel and the sixth sub-pixel are arranged along the arrangement direction of the pixel groups, the fifth sub-pixel and the sixth sub-pixel are spaced by other third color sub-pixels, and the number of the other third color sub-pixels is less than the preset number; and in the first mode, a phase difference between charging enabling levels provided by the driving signal lines corresponding to the fifth sub-pixel and the sixth sub-pixel is non-integer times of the noise cycle;

wherein, in the first mode:

the phase difference between the charging enabling levels provided by the driving signal lines corresponding to the first sub-pixel and the second sub-pixel is $\Delta T11$, and $\Delta T11=(N11+x11)\times P$, where P represents the noise cycle, N11 is an integer greater than or equal to 0, and $0<x11<1$;

the phase difference between the charging enabling levels provided by the driving signal lines corresponding to the third sub-pixel and the fourth sub-pixel is $\Delta T12$, and $\Delta T12=(N12+x12)\times P$, where N12 is an integer greater than or equal to 0, and $0<x12<1$;

the phase difference between the charging enabling levels provided by the driving signal lines corresponding to the fifth sub-pixel and the sixth sub-pixel is $\Delta T13$, and $\Delta T13=(N13+x13)\times P$, where N13 is an integer greater than or equal to 0, and $0<x13<1$, and wherein $x11=x12-x13$, or wherein at least two of x11, x12, and x13 are unequal to each other, and the first color sub-pixel is a red sub-pixel, the second color sub-pixel is a green sub-pixel, and the third color sub-pixel is a blue sub-pixel, and $|x12-0.5|<|x11-0.5|$, and $|x12-0.5|<|x13-0.5|$, and wherein the method comprises:

receiving, by the display panel, a noise signal in the first mode, wherein the noise signal has a noise cycle, and a phase difference between charging enabling levels provided by the driving signal lines corresponding to the first sub-pixel and the second sub-pixel is non-integer times of the noise cycle.

16. The method according to claim 15, wherein $\Delta T=(N+x)\times P$, where $\Delta T$ represents the phase difference between the charging enabling levels provided by the driving signal lines corresponding to the first sub-pixel and the second sub-pixel in the first mode, P represents the noise cycle, N is an integer greater than or equal to 0, and $0.4\leq x\leq 0.6$.

17. The method according to claim 16, wherein $x=0.5$.

18. The method according to claim 15, wherein the sub-pixels further comprise a second color sub-pixel and a third color sub-pixel;

the display panel comprises pixels, and at least one pixel of the pixels comprise the first color sub-pixel, the second color sub-pixel, and the third color sub-pixel;

wherein the at least one pixel of the pixels comprises a first pixel, and the first color sub-pixel, the second color sub-pixel, and the third color sub-pixel in the first pixel correspond to different driving signal lines; and wherein, in the first mode, a phase difference between charging enabling levels provided by the driving signal lines corresponding to the first color sub-pixel and the second color sub-pixel in the first pixel is [M−0.1, M+0.1] times of the noise cycle, where M is a positive integer; or a phase difference between charging enabling levels provided by the driving signal lines corresponding to the first color sub-pixel and the third color sub-pixel in the first pixel is [R−0.1, R+0.1] times of the noise cycle, where R is a positive integer.

19. A display apparatus, comprising a display panel, wherein the display panel comprises:

pixel groups, wherein at least one pixel group of the pixel groups comprises sub-pixels, and an arrangement direction of the pixel groups intersects an arrangement direction of the sub-pixels in the pixel group; and driving signal lines, wherein one driving signal line of driving signal lines corresponds to the sub-pixels in the at least one pixel group of the pixel groups, and the driving signal lines sequentially output charging enabling levels in a first order to drive the corresponding pixel groups, wherein the sub-pixels comprise a first color sub-pixel, the first color sub-pixels comprise a first sub-pixel and a second sub-pixel, the first sub-pixel and the second sub-pixel are located in different pixel groups and correspond to different driving signal lines, the first sub-pixel and the second sub-pixel are arranged along the arrangement direction of the pixel groups, the second sub-pixel and the first sub-pixel are spaced by other first color sub-pixels, and the number of the other first color sub-pixels is not greater than a preset number;

wherein the display panel has a first mode, and wherein, in the first mode, the display panel receives a noise signal having a noise cycle, and a phase difference between charging enabling levels provided by the driving signal lines corresponding to the first sub-pixel and the second sub-pixel is non-integer times of the noise cycle;

wherein the sub-pixels further comprises a second color sub-pixel and a third color sub-pixel;

wherein the second color sub-pixel comprises a third sub-pixel and a fourth sub-pixel, the third sub-pixel and the fourth sub-pixel are located in different pixel groups and correspond to different driving signal lines, the third sub-pixel and the fourth sub-pixel are arranged along the arrangement direction of the pixel groups, the third sub-pixel and the fourth sub-pixel are spaced apart by other second color sub-pixels, and the number of the other second color sub-pixels is less than the preset number; wherein in the first mode, a phase difference between charging enabling levels provided by the driving signal lines corresponding to the third sub-pixel and the fourth sub-pixel is non-integer times of the noise cycle;

the third color sub-pixel comprises a fifth sub-pixel and a sixth sub-pixel, the fifth sub-pixel and the sixth sub-pixel are located in different pixel groups and correspond to different driving signal lines, the fifth sub-pixel and the sixth sub-pixel are arranged along the arrangement direction of the pixel groups, the fifth sub-pixel and the sixth sub-pixel are spaced by other third color sub-pixels, and the number of the other third color sub-pixels is less than the preset number; and in the first mode, a phase difference between charging enabling levels provided by the driving signal lines corresponding to the fifth sub-pixel and the sixth sub-pixel is non-integer times of the noise cycle;

wherein, in the first mode:

the phase difference between the charging enabling levels provided by the driving signal lines corresponding to the first sub-pixel and the second sub-pixel is $\Delta T11$, and $\Delta T11=(N11+x11)\times P$, where P represents the noise cycle, N11 is an integer greater than or equal to 0, and $0<x11<1$;

the phase difference between the charging enabling levels provided by the driving signal lines corresponding to the third sub-pixel and the fourth sub-pixel is $\Delta T12$, and $\Delta T12=(N12+x12)\times P$, where N12 is an integer greater than or equal to 0, and $0<x12<1$;

the phase difference between the charging enabling levels provided by the driving signal lines corresponding to the fifth sub-pixel and the sixth sub-pixel is $\Delta T13$, and $\Delta T13=(N13+x13)\times P$, where N13 is an integer greater than or equal to 0, and $0<x13<1$, and wherein $x11=x12=x13$, or wherein at least two of x11, x12, and x13 are unequal to each other, and the first color sub-pixel is a red sub-pixel, the second color sub-pixel is a green sub-pixel, and the third color sub-pixel is a blue sub-pixel, and $|x12-0.5|<|x11-0.5|$, and $|x12-0.5|<|x13-0.5|$.

* * * * *